US012628105B2

(12) United States Patent
Lei et al.

(10) Patent No.: US 12,628,105 B2
(45) Date of Patent: May 12, 2026

(54) METHOD FOR WINDOW OFFSET DETERMINATION AND TERMINAL

(71) Applicant: SPREADTRUM SEMICONDUCTOR (NANJING) CO., LTD., Nanjing (CN)

(72) Inventors: Zhenzhu Lei, Nanjing (CN); Sicong Zhao, Nanjing (CN); Huayu Zhou, Nanjing (CN)

(73) Assignee: SPREADTRUM SEMICONDUCTOR (NANJING) CO., LTD., Nanjing (CN)

( * ) Notice: Subject to any disclaimer, the term of this patent is extended or adjusted under 35 U.S.C. 154(b) by 380 days.

(21) Appl. No.: 18/256,296

(22) PCT Filed: Nov. 23, 2021

(86) PCT No.: PCT/CN2021/132472
§ 371 (c)(1),
(2) Date: Jun. 7, 2023

(87) PCT Pub. No.: WO2022/121680
PCT Pub. Date: Jun. 16, 2022

(65) Prior Publication Data
US 2024/0040527 A1 Feb. 1, 2024

(30) Foreign Application Priority Data
Dec. 7, 2020 (CN) .......................... 202011421462.2

(51) Int. Cl.
*H04W 56/00* (2009.01)
*H04B 7/185* (2006.01)
*H04W 84/06* (2009.01)

(52) U.S. Cl.
CPC .... *H04W 56/0045* (2013.01); *H04B 7/18513* (2013.01); *H04W 84/06* (2013.01)

(58) Field of Classification Search
CPC ......... H04W 56/0045; H04W 56/0015; H04W 84/06; H04W 72/23; H04W 72/53; H04B 7/18513; H04B 7/18519
See application file for complete search history.

(56) References Cited

U.S. PATENT DOCUMENTS

| | | | |
|---|---|---|---|
| 2019/0363843 A1 | 11/2019 | Gordaychik | |
| 2019/0394770 A1 | 12/2019 | Wang et al. | |
| (Continued) | | | |

FOREIGN PATENT DOCUMENTS

| | | | |
|---|---|---|---|
| CN | 110557820 A | 12/2019 | |
| CN | 111064539 A | 4/2020 | |
| (Continued) | | | |

OTHER PUBLICATIONS

The extended European search report issued in corresponding EP application No. 21902387.6 dated May 28, 2024.
(Continued)

*Primary Examiner* — Shah M Rahman
(74) *Attorney, Agent, or Firm* — HAUPTMAN HAM, LLP

(57) ABSTRACT

Provided are a method for window offset determination and a terminal, which are applied to a NTN communication system. The NTN communication system comprises a terminal and a network device. The method includes the following. The terminal acquires the first configuration information from the network device and determines a current window offset according to the first configuration information. The current window offset is used to represent an offset of a starting position of a downlink search space window corresponding to a current pre-configured uplink resource relative to a starting time, furthermore, the starting time is the end position of the current pre-configured uplink resource.

17 Claims, 9 Drawing Sheets

(56) References Cited

U.S. PATENT DOCUMENTS

| | | | | |
|---|---|---|---|---|
| 2020/0120708 A1* | 4/2020 | Liu | .................... | H04W 72/0453 |
| 2020/0177323 A1* | 6/2020 | Fakoorian | ............. | H04W 72/21 |
| 2020/0383085 A1* | 12/2020 | Shih | .................... | H04W 68/005 |
| 2021/0328659 A1 | 10/2021 | Luo et al. | | |
| 2021/0400567 A1* | 12/2021 | Sha | ........................ | H04W 72/21 |
| 2022/0015089 A1* | 1/2022 | Shin | ....................... | H04L 1/1819 |
| 2022/0015148 A1* | 1/2022 | Sengupta | ........... | H04B 7/18576 |
| 2022/0046721 A1* | 2/2022 | Yan | ........................ | H04W 72/12 |
| 2022/0116881 A1* | 4/2022 | Shin | ........................ | H04W 52/48 |
| 2022/0329314 A1* | 10/2022 | Liu | ........................ | H04W 52/42 |
| 2022/0330184 A1 | 10/2022 | Lei | | |
| 2023/0247675 A1* | 8/2023 | Shen | ................. | H04W 74/0838 |
| | | | | 370/329 |

FOREIGN PATENT DOCUMENTS

| | | | |
|---|---|---|---|
| CN | 111565472 A | 8/2020 | |
| CN | 111867041 A | 10/2020 | |
| WO | 2020124602 A1 | 6/2020 | |
| WO | 2020135695 A1 | 7/2020 | |
| WO | 2020154744 A1 | 7/2020 | |
| WO | WO-2022082687 A1 * | 4/2022 | ........... H04W 24/08 |

OTHER PUBLICATIONS

WIPO, International Search Report and Written Opinion for International Application No. PCT/CN2021/132472, Feb. 16, 2022.

Ericsson, On the need for PUR L1 ACK application layer response, 3GPP TSG-RAN WG2 #108, R2-1915408, Nov. 8, 2019.

Futurewei, Feature lead summary of Support for transmission in preconfigured UL resources, 3GPP TSG RAN WG1 Meeting #99, R1-1912632, Nov. 20, 2019.

The first office action issued in corresponding CN application No. 202011421462.2 dated Oct. 20, 2022.

* cited by examiner

10

130

120

110

140          150

NG-RAN

TERMINAL

NR Uu

SATELLITE

NTN-GATEWAY gNB

NG

5G CORE NETWORK

N6

DATA NETWORK

REMOTE RADIO EQUIPMENT

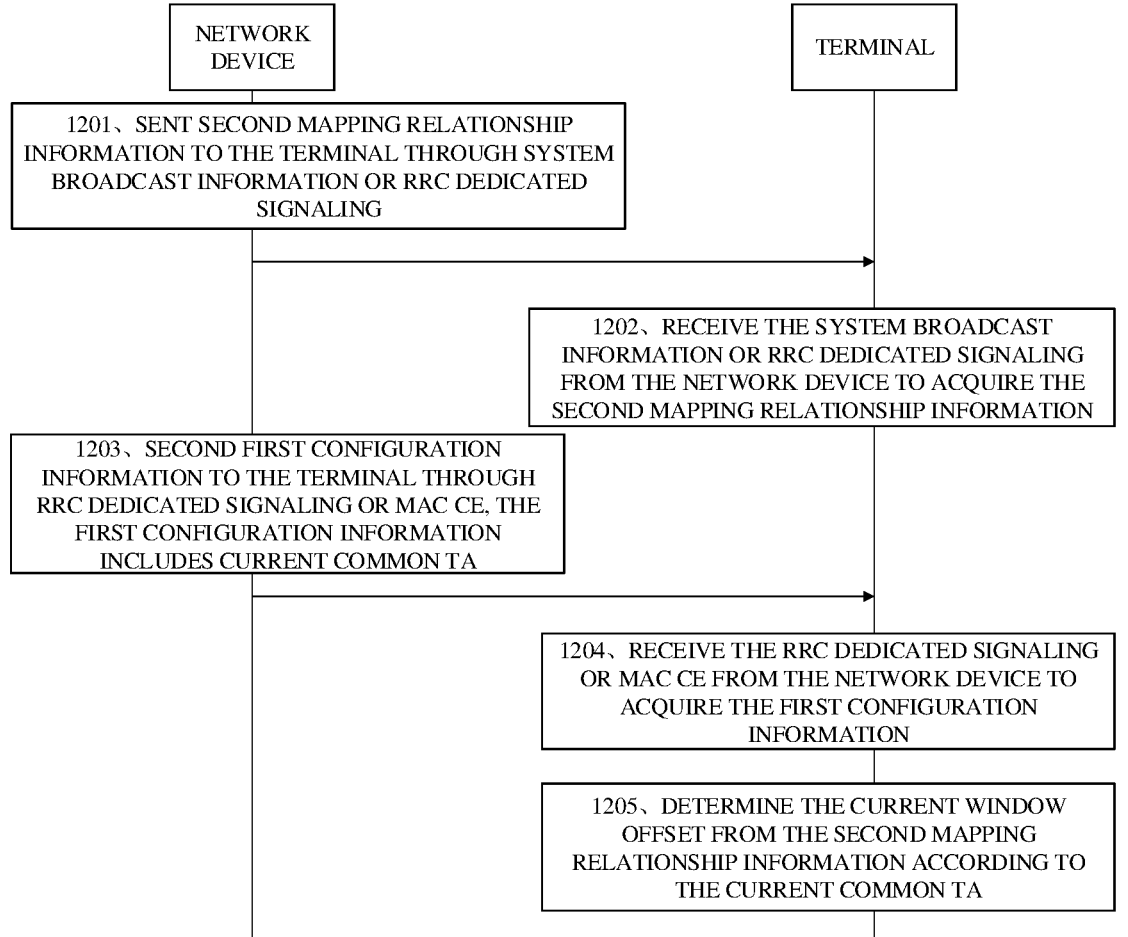

NETWORK DEVICE

TERMINAL

1201、 SENT SECOND MAPPING RELATIONSHIP INFORMATION TO THE TERMINAL THROUGH SYSTEM BROADCAST INFORMATION OR RRC DEDICATED SIGNALING

1202、 RECEIVE THE SYSTEM BROADCAST INFORMATION OR RRC DEDICATED SIGNALING FROM THE NETWORK DEVICE TO ACQUIRE THE SECOND MAPPING RELATIONSHIP INFORMATION

1203、 SECOND FIRST CONFIGURATION INFORMATION TO THE TERMINAL THROUGH RRC DEDICATED SIGNALING OR MAC CE, THE FIRST CONFIGURATION INFORMATION INCLUDES CURRENT COMMON TA

1204、 RECEIVE THE RRC DEDICATED SIGNALING OR MAC CE FROM THE NETWORK DEVICE TO ACQUIRE THE FIRST CONFIGURATION INFORMATION

1205、 DETERMINE THE CURRENT WINDOW OFFSET FROM THE SECOND MAPPING RELATIONSHIP INFORMATION ACCORDING TO THE CURRENT COMMON TA

FIG. 12

NETWORK DEVICE

TERMINAL

1301、SEND SECOND MAPPING RELATIONSHIP INFORMATION TO THE TERMINAL THROUGH SYSTEM BROADCAST INFORMATION OR RRC DEDICATED SIGNALING

1302、RECEIVE THE SYSTEM BROADCAST INFORMATION OR RRC DEDICATED SIGNALING FROM THE NETWORK DEVICE TO ACQUIRE THE SECOND MAPPING RELATIONSHIP INFORMATION

1303、SENT FIRST CONFIGURATION INFORMATION TO THE TERMINAL THROUGH SYSTEM BROADCAST INFORMATION OR RRC DEDICATED SIGNALING, THE FIRST CONFIGURATION INFORMATION INCLUDES CURRENT COMMON TA CHANGE RATE

1304、RECEIVE THE SYSTEM BROADCAST INFORMATION OR RRC DEDICATED SIGNALING FROM THE NETWORK DEVICE TO ACQUIRE THE FIRST CONFIGURATION INFORMATION

1305、DETERMINE THE CURRENT COMMON TA ACCORDING TO THE CURRENT COMMON TA CHANGE RATE

1306、DETERMINE THE CURRENT WINDOW OFFSET FROM THE SECOND MAPPING RELATIONSHIP INFORMATION ACCORDING TO THE CURRENT COMMON TA

FIG. 13

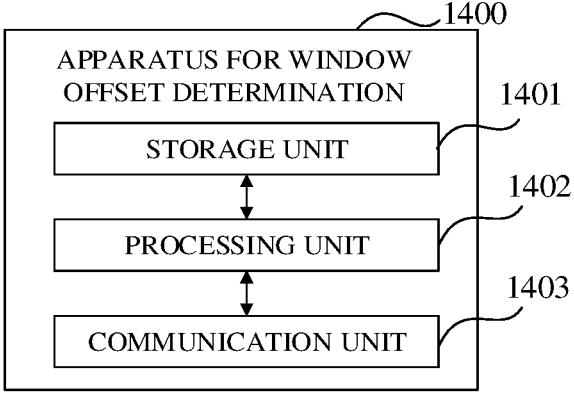

1400

APPARATUS FOR WINDOW OFFSET DETERMINATION

STORAGE UNIT — 1401

PROCESSING UNIT — 1402

COMMUNICATION UNIT — 1403

FIG. 14

METHOD FOR WINDOW OFFSET DETERMINATION AND TERMINAL

CROSS-REFERENCE TO RELATED APPLICATION(S)

This application is a National Stage of International Application No. PCT/CN2021/132472, field Nov. 23, 2021, which claims priority to Chinese Patent Application No. 2020114214622, filed Dec. 7, 2020, the entire disclosures of which are hereby incorporated by reference.

TECHNICAL FIELD

The disclosure relates to the field of communications technologies, and in particular, to a method for window offset determination and a terminal.

BACKGROUND

Currently, the 3rd generation partnership project (3GPP) is developing a protocol standard for non-terrestrial network (NTN) communication, where the protocol standard mainly relates to a spaceborne vehicle or an airborne vehicle, for example, a synchronous earth orbiting satellite, a near earth orbiting satellite, a high elliptical orbit satellite, and a high-altitude platform station (HAPS).

Compared with a terrestrial network communication system, a satellite in an NTN communication system generally generates a beam on the ground, or referred to as a beam footprint or a cell, and the satellite continuously moves along a fixed orbit, so that a propagation distance (or propagation delay) between a terminal located in the described beam or cell and the satellite changes continuously with a change in position of the satellite. As a result, the duration (namely, offset) of delay in starting time of a downlink search space window (PUR SS Window) corresponding to a pre-configured uplink resource (PUR) changes constantly. In this case, how to determine the offset for each starting position of the PUR SS Window needs further investigation.

SUMMARY

In a first aspect, a method for window offset determination is provided in an embodiment of the present disclosure, which is applied to a terminal in a non-terrestrial network (NTN) communication system, the NTN communication system includes the terminal and a network device.

The method includes the following. Acquire first configuration information from the network device. Determine a current window offset according to the first configuration information, where the current window offset is used to represent an offset of a starting position of a downlink search space window corresponding to a current pre-configured uplink resource relative to a starting time, and the starting time is an end position of the current pre-configured uplink resource.

In a second aspect, a terminal in an NTN communication system is provided.

The terminal includes a memory configured to store computer readable programs, a processor, and a transceiver. The processor is configured to invoke the computer readable programs to: cause the transceiver to acquire, through the communication unit, first configuration information from the network device; and determine a current window offset according to the first configuration information, where the current window offset is used to represent an offset of a starting position of a downlink search space window corresponding to a current pre-configured uplink resource relative to a starting time, and the starting time is an end position of the current pre-configured uplink resource.

In a third aspect, a non-transitory computer readable storage medium is provided in an embodiment of the disclosure, where the computer readable storage medium stores a computer program for exchanging electronic data, and the computer program enables a computer to execute part or all of the steps described in any method in the first aspect. Starting Position

BRIEF DESCRIPTION OF THE DRAWINGS

To describe the technical solutions in embodiments of the disclosure more clearly, the following briefly introduces the accompanying drawings required for describing the embodiments or the prior art. Apparently, the accompanying drawings in the following description show merely some embodiments of the disclosure, and a person of ordinary skill in the art may still derive other drawings from these accompanying drawings without creative efforts.

FIG. 12 is another schematic flowchart of a method for window offset determination according to an embodiment of the disclosure.

FIG. 13 is another schematic flowchart of a method for window offset determination according to an embodiment of the disclosure.

FIG. 14 is a block diagram of functional units of an apparatus for window offset determination according to an embodiment of the disclosure.

DETAILED DESCRIPTION

To make persons skilled in the art better understand the solutions of the disclosure, the following clearly and completely describes the technical solutions in embodiments of the disclosure with reference to the accompanying drawings in embodiments of the disclosure. Apparently, the described embodiments are merely a part rather than all of the embodiments of the disclosure. All other embodiments acquired by a person of ordinary skill in the art based on the embodiments of the disclosure without creative efforts shall belong to the scope of protection of the disclosure.

The terms "first", "second", and the like in the description and claims of the disclosure and the accompanying drawings are used for distinguishing different objects, rather than for describing a specific order. Furthermore, the terms "include" and "have" and any variations thereof are intended to cover exclusive inclusions. For example, a process, method, software, product or apparatus that includes a series of steps or units is not limited to the listed steps or units, but optionally further includes the steps or units not listed, or optionally further includes other steps or units inherent to the process, method, product or apparatus.

Reference herein to "an embodiment" means that a particular feature, structure, or characteristic described in connection with the embodiment can be included in at least one embodiment of the present disclosure. The appearances of this phrase in various places in the description are not necessarily all referring to the same embodiment, nor are separate or alternative embodiments mutually exclusive of other embodiments. It is apparent and implicitly understood by those skilled in the art that the embodiments described herein can be combined with other embodiments. Embodiments of the present disclosure will be described in detail below with reference to the accompanying drawings.

Technical solutions of the embodiments of the disclosure can be applied to a non-terrestrial network (NTN) communication system, and the NTN communication system generally provides a communication service for a ground terminal by means of satellite communication.

Figure 1:
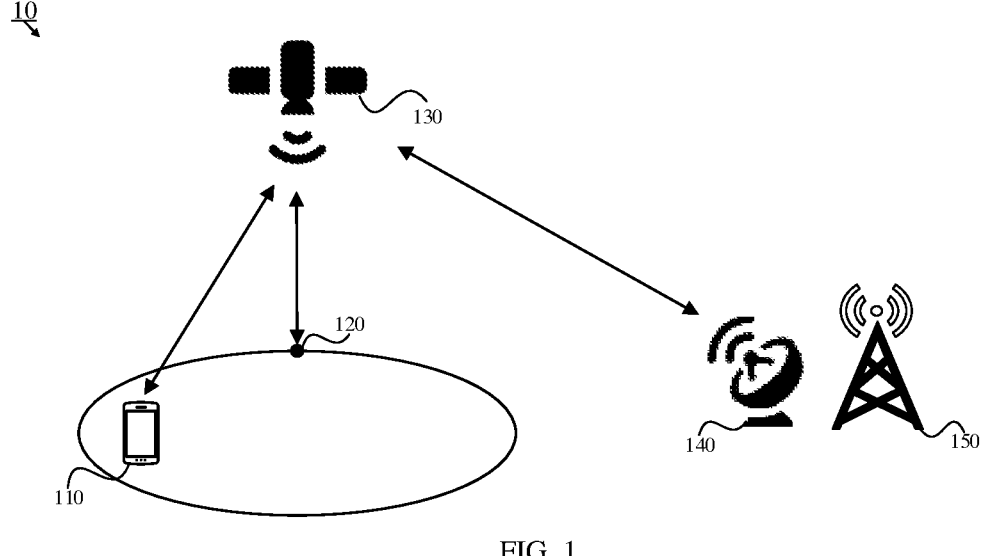
FIG. 1 is an architecture diagram of a non-terrestrial network (NTN) communication system according to an embodiment of the disclosure.

Exemplarily, the NTN communication system applied in embodiments of the disclosure is shown in FIG. 1. The NTN communication system 10 may include a terminal 110, an intra-cell reference point (reference point) 120, a satellite 130, an NTN gateway 140, and a network device 150. The terminal 110, the NTN gateway 140, and the network device 150 may be located on the surface of the Earth, and the satellite 130 may be located on the orbit of the Earth. The satellite 130 may provide communication services to the geographic area covered by signals, and may communicate with the terminals 110 located within the signal coverage area. Meanwhile, the terminal 110 is located in a certain cell, and the cell includes an intra-cell reference point 120. In addition, a wireless communication link between the terminal 110 and a satellite 130 is referred to as a service link, and a wireless communication link between the satellite 130 and an NTN gateway 140 is referred to as a feeder link. It should be noted that, the NTN gateway 140 and the network device 150 may be integrated into a same device, and may also be different separate devices, which is not specifically limited herein.

Embodiments of the disclosure are described in conjunction with a terminal, a satellite, and a network device, and will be specifically described below.

Specifically, the terminal in embodiments of the disclosure may be a user equipment (UE), an access terminal, a user unit, a user station, a mobile station, a mobile station, a remote station, a remote terminal, a mobile device, a user terminal, an intelligent terminal, a wireless communication device, a user agent, or a user apparatus. The terminal may also be a cellular telephone, a cordless telephone, a session initiation protocol (SIP) phone, a wireless local loop (WLL) station, a personal digital assistant (PDA), a handheld device having a wireless communication capability, a computing device or other processing device connected to a wireless modem, a relay device, an in-vehicle device, a wearable device, a next generation communication system such as a terminal in an new radio (NR) network or a future evolved public land mobile network, a terminal in a public land mobile network (PLMN), etc., which is not specifically limited.

Further, the terminal may be deployed on land, including indoor or outdoor, handheld, wearable, or vehicle-mounted; the terminal may be deployed on a water surface (such as a ship). The terminal may also be deployed in the air (e. g., airplane, balloon, satellite, etc.).

Further, the terminal may be a mobile phone, a tablet computer, a computer with a wireless transmit/receive (T/R) function, or a virtual reality (VR) terminal device, an augmented reality (AR) terminal device, a wireless terminal device in industrial control, a vehicle-mounted device in self driving, a wireless terminal device in remote medical, a wireless terminal device in smart grid, a wireless terminal device in transportation safety, a wireless terminal device in smart city, a wireless terminal device in smart home, or the like.

Specifically, the satellite in embodiments of the disclosure may be a spacecraft carrying a bent pipe payload or a regenerative payload signal transmitter, it usually operates at low earth orbits (LEO) of a height between 300 and 1500 km, at medium earth orbits (MEO) of a height between 7000 and 25000 km, at synchronized global earth orbits (GEO) of a height of 35786 km, or high elliptical orbits (HEO) of a height of between 400 to 50000 km. That is to say, the satellites may be LEO satellites, MEO satellites, GEO satellites, HEO satellites, or the like according to the difference in orbital altitude.

Further, the signals sent by the satellite in embodiments of the disclosure usually generate one or more beams (namely, beam footprint) in a given service area with a field of view of the satellite as a boundary. Meanwhile, the shape of a beam on the ground may be elliptical, and the field of view of the satellite depends on the antenna and the minimum elevation angle.

Specifically, the NTN gateway in embodiments of the disclosure may be an earth station or a gateway located on the surface of the earth, and can provide sufficient radio frequency (RF) power and RF sensitivity to connect satellites. Meanwhile, the NTN gateway may be a transport network layer (TNL) node.

Specifically, the network device in embodiments of the disclosure may be a base transceiver station (BTS) in a global system of mobile communication (GSM) communication system or a code division multiple access (CDMA) communication system, and a base station (nodeB) in a wideband code division multiple access (WCDMA) communication system, an evolved Node B (eNB or eNodeB) in a long term evolution (LTE) communication system, or a base station (eNB) in an NR communication system. The network device may also be an access point (AP) in a wireless local area network (WLAN), a relay station, a network device in a future evolved PLMN network, a network device in an NTN communication system, or the like.

It should be noted that in some network deployments, the gNB may include a centralized unit (CU) and a distributed unit (DU), and the gNB may also include an active antenna unit (AAU). The CU may implement partial functions of the gNB, and the DU may also implement partial functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a medium access control (MAC) layer and a physical (PHY) layer. In addition, the AAU realizes some physical layer processing functions, radio frequency processing and related functions of the active antenna. Since the information of the RRC layer will eventually become the information of the PHY layer, or is converted from the information of the PHY layer, the higher-layer signaling (such as the RRC layer signaling) can be considered to be sent by the DU, or sent by the DU+AAU. It can be understood that the network device may include one or more devices of a CU node, a DU node, and an AAU node. In addition, the CU may be classified into a network device in a radio access network (RAN), and the CU may also be classified into a network device in a core network (CN), which is not specifically limited.

Figure 2:
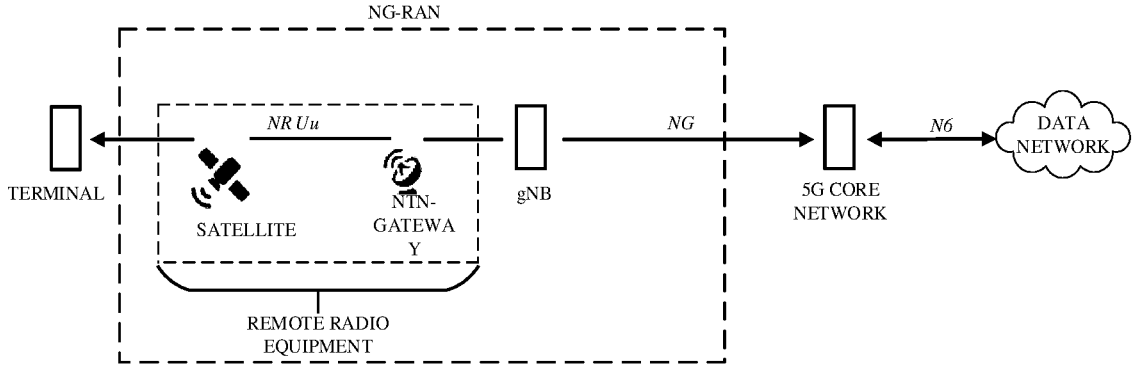
FIG. 2 is a schematic diagram of an architecture with a transparent satellite communication system according to an embodiment of the present disclosure.

Exemplarily, embodiments of the disclosure provide a schematic architecture diagram of a transparent satellite communication system, as shown in FIG. 2. A terminal, a NTN gateway, and a gNB are located on the surface of the Earth, and a satellite is located on the orbit of the Earth. Meanwhile, the satellite, the NTN gateway, and the gNB may serve as a 5G radio access network (NG-RAN), and the NG-RAN is connected to a 5G core network through an NG interface. It should be noted that the satellite payload implements frequency conversion and a radio frequency amplifier in both the uplink and downlink directions, and the satellite corresponds to an analog RF repeater. In addition, different transparent satellites may be connected to the same gNB on the ground.

Before the method for window offset determination according to the embodiments of the disclosure is described in detail, related communication technologies involved in the disclosure are introduced.

1. NTN Communication System

In an NTN communication system, a satellite usually generates one or more beams (namely, beam footprint) or cells on the ground, and the shape of one beam on the ground may be an ellipse. A beam or cell generated by some satellites (e. g., a LEO satellite) on the ground may also move on the ground as the satellite moves along its orbit. Alternatively, a beam or cell generated by some satellites (e. g., a LEO satellite or a GEO satellite) on the ground may not move on the ground as the satellite moves along its orbit.

Figure 3:
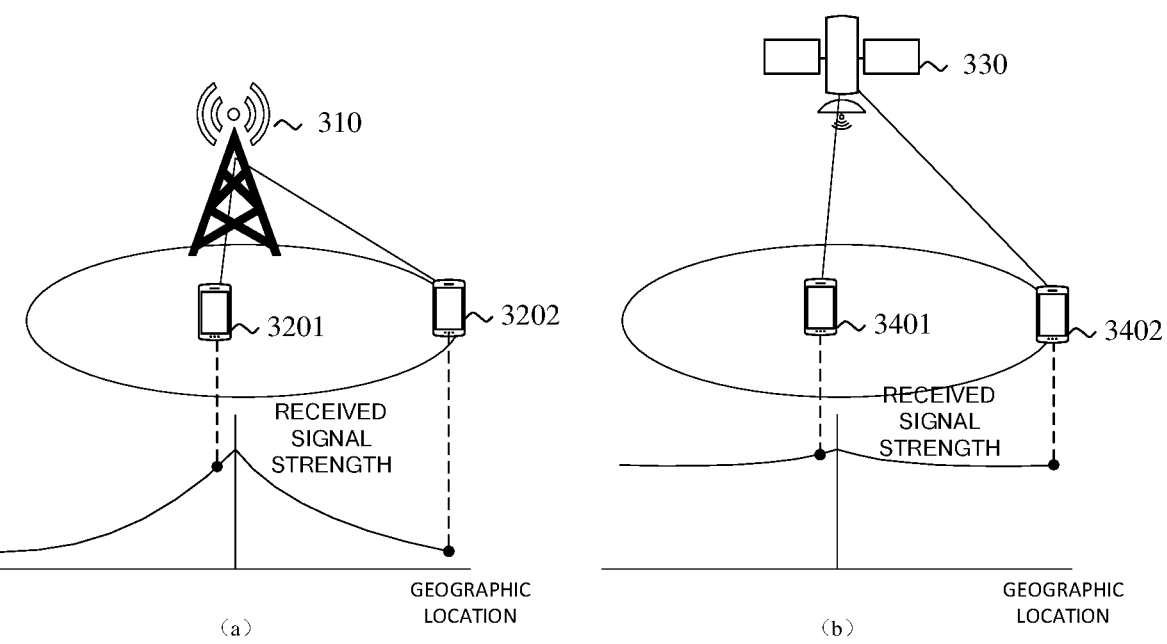
FIG. 3 is a schematic structural diagram illustrating received signal quality comparison between a land-based network communication system and a NTN communication system according to an embodiment of the disclosure.

Because the distance from the satellite to the ground is very long (for example, 35786 km for a GEO satellite), therefore, within the coverage range of the same beam or cell, the difference of propagation distances between terminals (such as UEs) in different geographical positions and satellites is relatively small (namely, the difference of path losses of signals corresponding to terminals in different geographical positions within the coverage range of the same beam/cell is relatively small), as a result, there is a very small difference between the signal reception qualities (including the downlink reception quality of the terminal or the uplink reception quality of the base station) corresponding to terminals at different geographical positions within the coverage area of the same beam/cell, as shown in FIG. 3.

In the terrestrial network communication system shown in (a) of FIG. 3, there are terminals 3201 and 3202 in different geographical locations within the coverage area of the same beam/cell. Because a large difference exists between the transmission distance from the network device 310 to the terminal 3201 and the transmission distance from the network device 310 to the terminal 3202, a large difference exists between the signal reception quality corresponding to the terminal 3201 and the signal reception quality corresponding to the terminal 3202. In the NTN communication system shown in (b) of FIG. 3, terminals 3401 and 3402 in different geographical locations are within the coverage area of the same beam/cell. Because the distance from the satellite 330 to the ground is very far, there is a small difference between the propagation distance from the satellite 330 to the terminal 3401 and the propagation distance from the satellite 330 to the terminal 3402, so that there is a small difference between the signal reception quality corresponding to the terminal 3401 and the signal reception quality corresponding to the terminal 3402.

2. Earth-Fixed Beam Scenario of NTN Communication System

Figure 4:
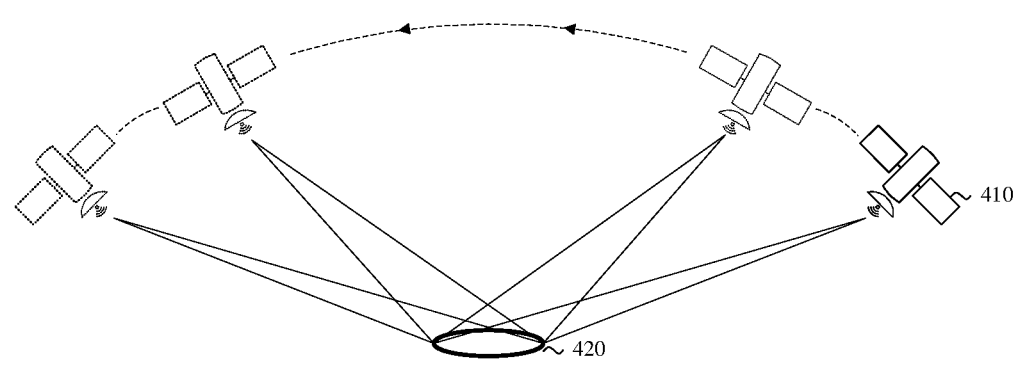
FIG. 4 is a schematic structural diagram of an earth-fixed beam scenario of an NTN communication system according to an embodiment of the disclosure.

In an earth-fixed beam scenario of an NTN communication system, although a satellite may move along a fixed orbit, a beam or a cell generated by some satellites (for example, an LEO satellite or a GEO satellite) on the ground may not move on the ground as the satellite moves along the orbit, as shown in FIG. 4. The beam 420 generated by the satellite 410 on the ground does not move with the movement of the satellite 410, but has a fixed position.

3. Architecture of NTN Communication System

Figure 5:
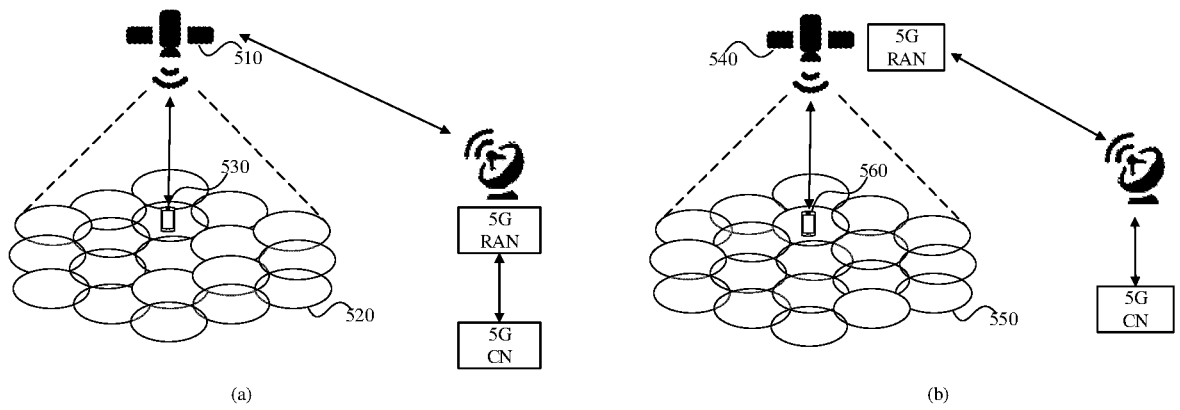
FIG. 5 is an architecture diagram of architecture comparison of an NTN communication system according to an embodiment of the disclosure.

The architecture of the NTN communication system in embodiments of the disclosure mainly includes an NTN communication architecture with a transparent satellite (or referred to as a bent pipe payload) (namely, a transparent mode) and an NTN communication architecture with a regenerated satellite (namely, a regenerative mode), as shown in FIG. 5. (a) of FIG. 5 illustrates an NTN communication architecture with a transparent satellite, and (b) of FIG. 5 illustrates an NTN communication architecture with a regenerated satellite. In (a) of FIG. 5, the satellite 510 in the transparent mode generates at least one beam 520 on the ground, and the at least one beam 520 may form a cell on the ground. At this time, the terminal 530 in the cell may measure one of all beams of the cell and establish a communication connection with the satellite 510 through the beam. By the same reasoning, in (b) of FIG. 5, the satellite 540 in the regenerated signal pattern generates at least one beam 550 on the ground, and the at least one beam 550 may form a cell on the ground. At this point, a terminal 560 within the cell can measure one of all the beams of the cell and establish a communication connection with the satellite 540 via the beam.

Timing Advance (TA) in an NTN Communication System

In an NTN communication system, because a satellite moves continuously along a fixed orbit, a propagation delay (or a propagation distance) between a terminal and the satellite and a propagation delay (or a propagation distance) between the satellite and a network device (or a NTN gateway) change rapidly as the satellite moves continuously. In order to solve the problem of continuous change of propagation delay, before sending uplink data, the terminal needs to perform TA pre-compensation (namely, TA adjustment). One part of the compensation value may be obtained by the terminal through calculation according to position information (for example, obtained through calculation by a global navigation satellite system) and a satellite ephemeris, and the other part of the compensation value may be obtained by the terminal through calculation according to a common timing advance rate indicated by a network. It should be noted that the common timing advance has an association relationship with the satellite position, that is, the common timing advance has an association relationship with the propagation distance from the satellite to the terminal.

5. Pre-Configured Uplink Resource (PUR)

In a current NR communication system, a terminal in an idle state or an inactive state can transmit data only after entering a connected state through a random access process. Such a data transmission mechanism in the idle/inactive state may cause problems such as increasing RRC signaling overhead, energy consumption of the UE, or data transmission delay. In order to ensure that a terminal can directly send data in the idle state, a processing mechanism in narrow band internet of things (NB-IoT) or enhanced machine-type communication (eMTC) is that a network configures a periodic PUR and a downlink search space window (PUR SS window) corresponding to the PUR for the terminal. Meanwhile, after the terminal sends the uplink data via the PUR, the terminal may receive ACK feedback information, fallback indication information, or retransmission scheduling information via the PUR SS window corresponding to the PUR. An offset exists between the PUR and the PUR SS window, that is to say, the terminal can determine the starting time of the PUR SS window according to the offset.

Figure 6:
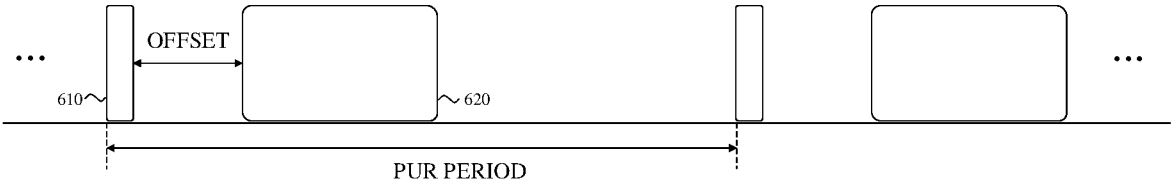
FIG. 6 is a schematic structural diagram of an offset of a downlink search space window corresponding to a pre-configured uplink resource according to an embodiment of the disclosure.

Exemplarily, referring to FIG. 6, in one PUR period, an offset exists between a PUR 610 and a downlink search space window 620 corresponding to the PUR.

However, compared with a terrestrial network communication system, since a great propagation distance (or propagation delay) exists between the satellite and the terminal in the NTN communication system, after the terminal sends uplink data by means of a PUR, a PUR SS window corresponding to the PUR needs to be started in a delayed manner, thereby ensuring that relevant information issued by the network device is received during running of the PUR SS window. In addition, since the propagation delay between the terminal and the satellite changes continuously with the change in position of the satellite, the time length (namely, offset) of delay in starting of the PUR SS window also changes continuously, thereby resulting in a problem that the network device and the terminal cannot agree with each other regarding the offset.

Provided are a method and apparatus for window offset determination, a terminal and a network device, so as to expect to realize self-adaptive adjustment of an offset of a downlink search space window corresponding to a pre-configured uplink resource between a network device and a terminal, and ensure that the network device and the terminal always achieve consistency in terms of the offset.

Figure 7:
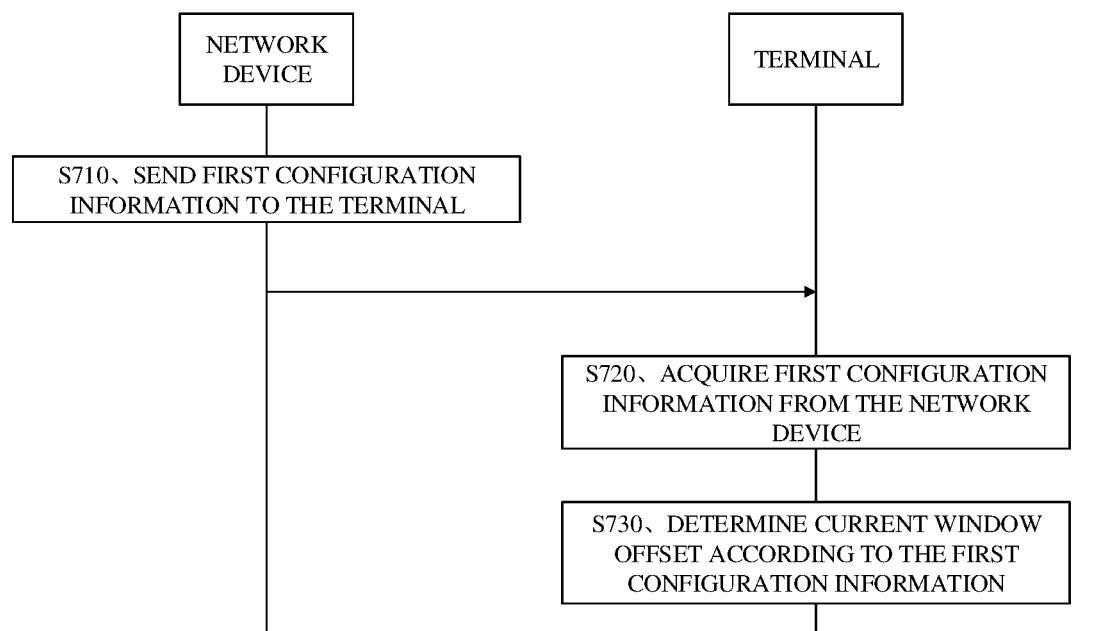
FIG. 7 is a schematic flowchart of a method for window offset determination according to an embodiment of the disclosure.

In conjunction with the above description, embodiments of the disclosure provide a schematic flowchart of a method for window offset determination, which is applied to a NTN communication system, referring to FIG. 7. The method includes the following.

S710, a network device sends first configuration information to a terminal.

The first configuration information can be used for determining a current window offset, and the current window offset is used to represent an offset of a starting position of a downlink search space window corresponding to a current pre-configured uplink resource relative to a starting time, and the starting time can be an end position of the current pre-configured uplink resource.

It should be noted that the technical solutions in embodiments of the disclosure are not only applicable to a transparent mode, but also applicable to a regenerative mode. In the transparent mode, the first configuration information is sent by the network device located on the ground. In the regenerative mode, because the network device is located on the satellite, the first configuration information is sent by the network device located on the satellite.

In addition, the current window offset in embodiments of the disclosure may be understood as a first window offset, and "first" and "second" in embodiments of the disclosure are used to distinguish different objects, rather than being used to describe a specific sequence.

It should be further noted that the satellite in the NTN communication system may generate a beam or a cell on the ground, furthermore, the satellite moves continuously along a fixed orbit, and therefore, a propagation distance (or propagation delay) between a terminal located in the beam or the cell and the satellite changes continuously with the change in position of the satellite. As a result, the offset of the starting position of the PUR SS Window corresponding the PUR will also change continuously. To this end, in embodiments of the disclosure, the network device sends first configuration information to the terminal, and the terminal determines the current offset of the PUR SS window according to the first configuration information. Thus, it is ensured that the offset of the starting position of the PUR SS window is adaptively adjusted with the continuous change of the propagation distance between the terminal and the satellite, to realize adaptive adjustment of the offset of the PUR SS window between the network device and the terminal, and to ensure that the network device and the terminal always maintain consistency in terms of offset of the PUR SS window.

Specifically, the unit of the current window offset may be one of milliseconds (ms), sub-frames, frames and slots, which is not specifically limited.

Specifically, the first configuration information may be indicated by at least one of radio resource control (RRC) dedicated signaling, a media access control control-element (MAC CE), and system broadcast information.

It should be noted that, in embodiments of the disclosure, the network device may send the first configuration information to the terminal through at least one of the RRC dedicated signaling, the MAC CE, and the system broadcast information, so as to implement adaptive adjustment of the corresponding PUR SS window of the current PUR.

Further, the system broadcast information may include system information block (SIB) information.

S720, the terminal acquires the first configuration information from the network device.

S730, the terminal determines a current window offset according to the first configuration information.

It can be seen that in embodiments of the disclosure, the network device in the NTN communication system sends the first configuration information to the terminal in the NTN communication system. Then, the terminal acquires the first configuration information, and determines the current window offset according to the first configuration information. The current window offset is used to represent the offset of a starting position of the downlink search space window corresponding to the current pre-configured uplink resource relative to the starting time, furthermore, the starting time is the end position of the current pre-configured uplink resource, which helps to ensure that the offset of starting position of the downlink search space window is adaptively adjusted as the propagation distance between the terminal and the satellite changes, to realize adaptive adjustment of the offset of the downlink search space window between the network device and the terminal, and it can ensure that the network device and the terminal always maintain consistency in terms of offset of the downlink search space window.

In conjunction with the above description, the following embodiments of the disclosure introduce the first configuration information in detail.

In a possible example, the first configuration information may include one of the following: initial value index information, effect-delay information, first mapping relationship information, a current common timing advance (TA), and a current common TA change rate.

Specifically, the initial value index information may be used for determining a target value in a value list information, and the value list information is configured by the network. The effect-delay information may be indicative of a delay for the terminal to take the target value as the current window offset. The value list information may be indicative of a list composed of multiple window offsets (namely, at least two window offsets) in sequence.

It should be noted that, in the embodiment of the disclosure, the first configuration information includes initial value index information and effect-delay information. Since the value list information can be indicative of a list composed of multiple window offsets in sequence, and the values in the value list information can be indicative of the window offsets in the multiple window offsets, the terminal can determine a target value in the value list information according to the initial value index information, and then take the target value as the current window offset according to the effect-delay information. Because both the first configuration information and the value list information are configured by the network device, it is further ensured that the offset of the starting position of the downlink search space window is adaptively adjusted with the continuous change of the propagation distance between the terminal and the satellite, to realize adaptive adjustment of the offset of the downlink search space window between the network device and the terminal, and it is ensured that the network device and the terminal always maintain consistency in terms of offset of the downlink search space window.

Further, the value list information may satisfy at least one of the following modes: a value(s) in the value list information is determined by a propagation distance between the terminal and the satellite in the NTN communication system, and an order of the values in the value list information corresponds to a movement position of the satellite.

It should be noted that, because the satellite is very far away from the ground, even if the terminal moves continuously (namely, the position where the terminal is currently located changes continuously) within a period of time, the propagation distance between the terminal and the satellite changes less. Based on this, in embodiments of the disclosure, it is considered that the position of the terminal is approximately fixed in a period of time, and the change of the satellite position results in the continuous change of the propagation distance between the terminal and the satellite.

Meanwhile, the satellite has a fixed moving trajectory (for example, the moving trajectory is determined by the satellite ephemeris). Therefore, in embodiments of the disclosure, the network device determines a set of propagation distances ("propagation distance set" for short) between the terminal and the satellite according to the movement trajectory of the satellite and a position where the terminal is currently located, then, the network device determines each value in the value list information according to the propagation distance set, thereby establishing a mapping relationship between the propagation distance between the terminal and the satellite and the value in the value list information. In addition, the order of the values in the value list information corresponds to the movement positions of the satellite, and the correspondence may be a one-to-one correspondence.

Specifically, the first mapping relationship information may be indicative of a mapping relationship between the propagation distance from the terminal to the satellite in the NTN communication system and the window offset.

It should be noted that, in embodiments of the disclosure, the network device determines the set of propagation distances between the terminal and the satellite according to the movement trajectory of the satellite and a position where the terminal is currently located, then establishes the mapping relationship between the set of propagation distances and multiple window offsets to obtain the first mapping relationship information. Thus, the terminal determines the current window offset according to the first mapping relationship information, and further ensures that the offset of the starting position of the downlink search space window is adaptively adjusted as the propagation distance between the terminal and the satellite changes, to realize adaptive adjustment of the offset of the downlink search space window between the network device and the terminal, and it is ensured that the network device and the terminal always maintain consistency in terms of offset of the downlink search space window.

Specifically, the current common timing advance may be used for determining the current window offset from second mapping relationship information, where the second mapping relationship information is configured by the network. The current common timing advance change rate may be used for determining the current common timing advance, and the second mapping relationship information may be indicative of the mapping relationship between the common timing advance and the window offset. The mapping relationship may be that an interval of one common timing advance corresponds to one window offset.

It should be noted that, in the embodiment of the disclosure, the first configuration information includes the current common timing advance or the current common timing advance change rate. In this case, the terminal may determine the current window offset from the second mapping relationship information according to the current common timing advance. Alternatively, the terminal may determine the current common timing advance according to the current common timing advance change rate, and then determine the current window offset from the second mapping relationship information according to the current common timing advance. Since the first configuration information and the second mapping relationship information are both configured by the network device, it is further ensured that the offset of the starting position of the downlink search space window is adaptively adjusted as the propagation distance between the terminal and the satellite changes, to realize adaptive adjustment of the offset of the downlink search space window between the network device and the terminal, and it is ensured that the network device and the terminal always maintain consistency in terms of offset of the downlink search space window.

It can be seen from the above description that, since there are different kinds of information included in the first configuration information, the embodiments of the disclosure can have different technical solutions to solve the problem of how to determine the window offset. The following embodiments of the disclosure will specifically introduce different technical solutions from the following situations.

Case 1:

In a possible example, if the first configuration information includes the initial value index information and the effect-delay information, before the network device sends the first configuration information to the terminal, the method can further include: the network device sends first information to the terminal, where the first information includes value list information.

In a possible example, if the first configuration information includes the initial value index information and effect-delay information, before the terminal acquires the first configuration information from the network device, the method can further include: the terminal acquires the first information from the network device, where the first information includes the value list information.

Specifically, the first information may be indicated by system broadcast information or RRC dedicated signaling.

It should be noted that, in the embodiment of the disclosure, the network device sends the first information to the terminal through system broadcast information or RRC dedicated signaling so that the terminal can acquire the value list information, that is to say, the value list information is indicated or configured to the terminal through the system broadcast information or the RRC dedicated signaling.

Further, the system broadcast information may include system information block (SIB) information.

In a possible example, the terminal determines the current window offset according to the first configuration information as follows: the terminal determines a target value from the value list information according to the initial value index information; after the effect-delay information expires, the terminal uses the target value as the current window offset.

It should be noted that, the value list information may be indicative of a list composed of multiple window offsets in sequence, and a value in the value list information is indicative of a window offset in the multiple window offsets. Therefore, the terminal may use the initial value index information to index a value at a corresponding position from the value list information to acquire the target value, thus, the target value is taken as the current window offset.

In addition, since the value in the value list information configured by the network device is determined by the propagation distance between the terminal and the satellite, and the propagation distance changes as the satellite changes in position, in order to synchronize the current window offset between the network device and the terminal, in embodiments of the disclosure, the network device configures the effect-delay information. Where the effect-delay information can effectively reflect the position change of the satellite, and the terminal uses the target value as the current window offset after the effect-delay information expires, so as to further ensure that the offset of the starting position of the downlink search space window can be adaptively adjusted with the continuous change of the propagation distance between the terminal and the satellite, to realize adaptive adjustment of the offset of the downlink search space window between the network device and the terminal, and it is ensured that the network device and the terminal always maintain consistency in terms of offset of the downlink search space window.

It can be seen from the above description that the terminal determines the current window offset according to the initial value index information, the effect-delay information, and the value list. To this end, the embodiments of the disclosure also consider the technical solution of how to update the current window offset, which will be described in detail in the following two sub-cases.

Sub-Case 1:

In a possible example, the first information can further include period update information, where the period update information may be indicative of a period of updating, by the terminal, the current window offset to a value that is next to the position of the target value in the value list information, and the period starts from when the effect-delay information expires.

It can be understood that the network device may simultaneously configure or indicate the value list information and the period update information to the terminal. In this case, the terminal may update the current window offset periodically according to the period update information.

Specifically, the unit of the period may be one of milliseconds (ms), a sub-frame, a frame, and a slot, which is not specifically limited herein.

Sub-Case 2:

In a possible example, after the network device sends the first configuration information to the terminal, the method further includes: send first indication information to the terminal through an MAC CE, the first indication information is used for instructing the terminal to update the current window offset to a value that is next to the position of the target value in the value list information.

In a possible example, after the terminal determines the current window offset according to the first configuration information, the method further includes: the terminal receives the MAC CE from the network device to acquire the first indication information, the first indication information is used for instructing the terminal to update the current window offset to a value that is next to the position of the target value in the value list information.

It can be understood that, the network device instructs the terminal to update the current window offset by delivering the MAC CE.

In conclusion, the following embodiments of the disclosure further summarize the technical solution in "Case 1" into the following two manners.

Manner 1:

For the network device, the network device sends the first information to the terminal through system broadcast information or RRC dedicated signaling. The first information includes the value list information and the period update information, and then the network device sends the first configuration information to the terminal through RRC dedicated signaling or MAC CE. The first configuration information includes the initial value index information and the effect-delay information.

With regard to the terminal, first of all, the terminal receives the system broadcast information or RRC dedicated signaling from the network device to acquire the first information, where the first information includes the value list information and period update information; and second, the terminal receives RRC dedicated signaling or MAC CE from the network device to acquire the first configuration information. The first configuration information includes the initial value index information and the effect-delay information. Next, the terminal determines the target value from the value list information according to the initial value index information, and uses the target value as the current window offset after the effect-delay information expires. Finally, the terminal updates the current window offset to a value next to the position of the target value in the value list information according to the period update information.

Figure 8:
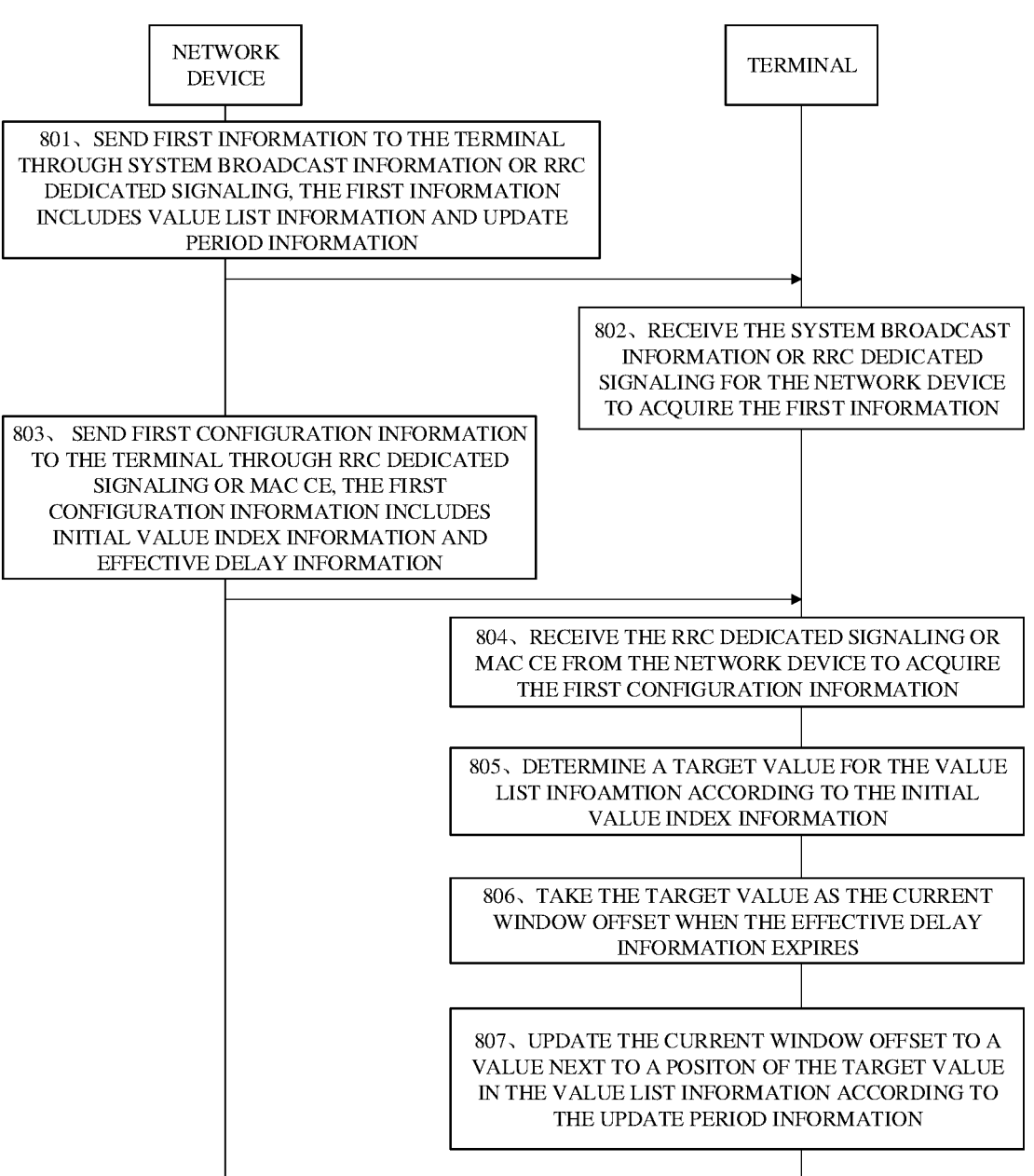
FIG. 8 is another schematic flowchart of a method for window offset determination according to an embodiment of the disclosure.

Exemplarily, "Manner 1" may be exemplified as the process shown in FIG. 8.

Manner 2:

For the network device, the network device sends the first information to the terminal through system broadcast information or RRC dedicated signaling. The first information includes the value list information, and then the network device sends the first configuration information to the terminal through RRC dedicated signaling or MAC CE. Where the first configuration information includes initial value index information and the effect-delay information. And finally, the network device sends the first indication information to the terminal through MAC CE.

For the terminal, first, the terminal acquires the first information from the network device through the system broadcast information or RRC dedicated signaling, where the first information includes value list information; and second, the terminal acquires the first configuration information from the network device through the RRC dedicated signaling or MAC CE. The first configuration information includes the initial value index information and the effect-delay information. Next, the terminal determines the target value from the value list information according to the initial value index information, and uses the target value as the current window offset after the effect-delay information expires. Finally, the terminal receives MAC CE from the network device to acquire the first indication information, and updates the current window offset to a value which is next to the position of the target value in the value list information according to the first indication information.

Figure 9:
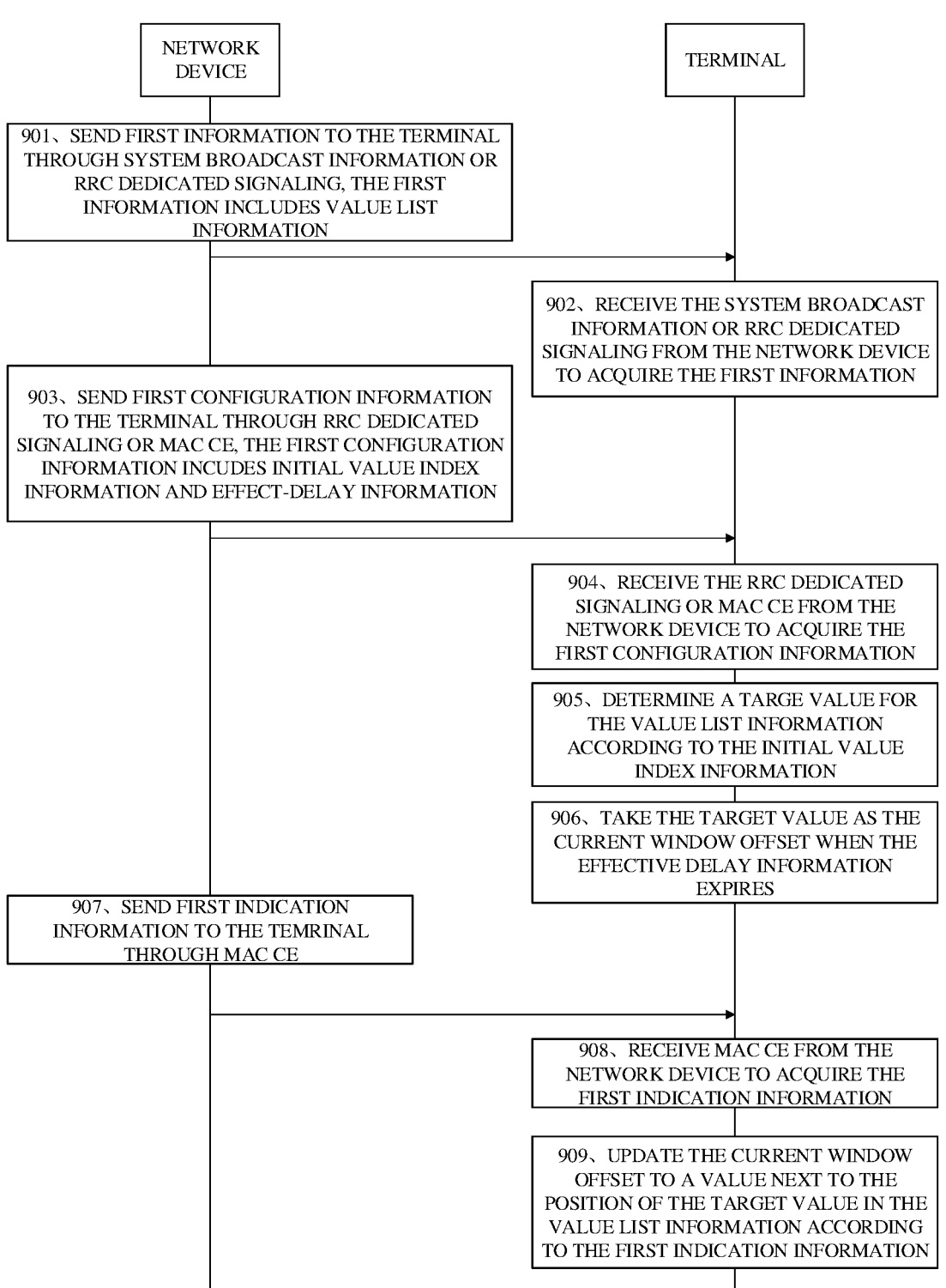
FIG. 9 is another schematic flowchart of a method for window offset determination according to an embodiment of the disclosure.

Exemplarily, "Manner 2" may be exemplified as the process shown in FIG. 9.

In conclusion, the following embodiments of the disclosure further illustrate the technical solution in the "Case 1" as an example.

Example 1: the terminal acquires from the network device, through system broadcast information or RRC dedicated signaling, the value list information to be {K1, K2, K3, K4, K5} and the period update information to be X sub-frames. Second, the terminal acquires from the network device, through RRC dedicated signaling or MAC CE, the initial value index to be 2 and the effect-delay information to be Y sub-frames. Next, the terminal acquires the target value K2 from the value list information according to the initial value index information, and uses K2 as the current window offset after Y sub-frames are timeout. Finally, start from the moment when the effect-delay information expires and after X sub-frames, the terminal updates the current window offset to the value next to the position of K2 in {K1, K2, K3, K4, K5}, that is, K3. It should be noted that, the terminal may update, start from K2, the next value at intervals of X sub-frames, that is, K2 is in the first X sub-frames, K3 is in the second X sub-frames, and so on.

Example 2: the terminal acquires the value list information from the network device through system broadcast information or RRC dedicated signaling, which is {K1, K2, K3, K4, K5}. Second, the terminal acquires from the network device, through RRC dedicated signaling or MAC CE, the initial value index information to be 2 and the effect-delay information to be Y sub-frames. Next, the terminal acquires the target value K2 from the value list information according to the initial value index information, and uses K2 as the current window offset after the Y sub-frames ends. Finally, the terminal acquires the first indication information through the MAC CE for the first time, and updates the current window offset to the value next to the position of K2 in {K1, K2, K3, K4, K5} according to the first indication information, that is, K3. It should be noted that, when the terminal acquires the first indication information through the MAC CE for the second time, the terminal updates K3 to K4, and so on.

Case 2:

In a possible example, if the first configuration information includes the first mapping relationship information, before the network device sends the first configuration information to the terminal, the method may further include the following. The network device sends second configuration information for PUR transmission to the terminal, the second configuration information may include PUR transmission period information, resource configuration information about a PUR transmission occasion, and mapping relationship information between a PUR transmission resource block and a window offset.

In a possible example, if the first configuration information includes the first mapping relationship information, before the terminal acquires the first configuration information from the network device, the method further includes the following. The terminal acquires second configuration information for PUR transmission from the network device, the second configuration information includes PUR transmission period information, resource configuration information about a PUR transmission occasion, and mapping relationship information between a PUR transmission resource block and a window offset.

Specifically, the PUR transmission period information may be indicative of a period of the PUR transmission.

Specifically, the resource configuration information about the PUR transmission occasion may be indicative of multiple RUR transmission resource blocks configured for the PUR transmission occasion. The multiple PUR transmission resource blocks can be differentiated in a time division manner or a frequency division manner.

Specifically, the mapping relationship information between the PUR transmission resource blocks and the window offsets may be indicative of the mapping relationship between the multiple RUR transmission resource blocks configured for the PUR transmission occasion and the multiple window offsets. The mapping may be that each of the multiple RUR transmission resource blocks corresponds to one of the multiple window offsets. The following gives an exemplary description with reference to FIG. 10.

Figure 10:
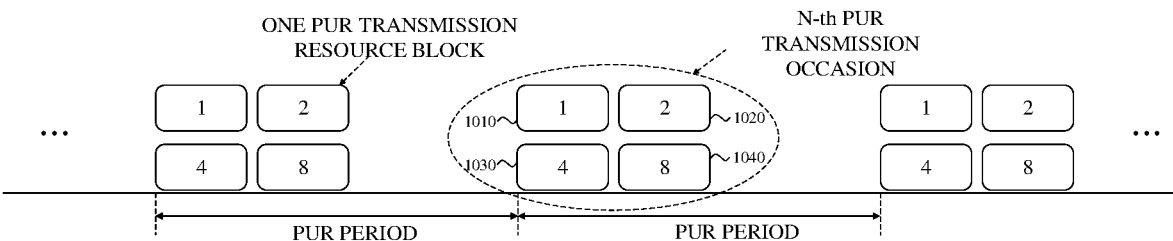
FIG. 10 is a schematic structural diagram of a mapping relationship between multiple RUR transmission resource blocks and multiple window offsets according to an embodiment of the disclosure.

Exemplarily, referring to FIG. 10, four PUR transmission resource blocks are configured for the n-th PUR transmission occasion, that is, a PUR transmission resource block 1010, a PUR transmission resource block 1020, a PUR transmission resource block 1030, and a PUR transmission resource block 1040. The window offset corresponding to the PUR transmission resource block 1010 is 1 sub-frame, the window offset corresponding to the PUR transmission resource block 1020 is 2 sub-frames, the window offset corresponding to the PUR transmission resource block 1030 is 3 sub-frames, and the window offset corresponding to the PUR transmission resource block 1040 is 4 sub-frames.

Specifically, the second configuration information may be indicated by RRC dedicated signaling.

It should be noted that, in embodiments of the disclosure, the network device sends the second configuration information to the terminal through RRC dedicated signaling, such that the terminal can acquire the PUR transmission period information, resource configuration information about a PUR transmission occasion, and mapping relationship information between a PUR transmission resource block and a window offset.

In a possible example, the terminal may determine the current window offset according to the first configuration information as follows. The terminal acquires first propagation distance information, where the first propagation distance information may be indicative of a propagation distance between position information where the terminal is currently located and a satellite; the terminal determines the current window offset from first mapping relationship information according to the first propagation distance information.

It should be noted that, the first propagation distance information may be indicative of the propagation distance between the current position information of the terminal and the satellite. Furthermore, the first mapping relationship information may be indicative of a mapping relationship between the propagation distance from the terminal to the satellite and the window offset. Therefore, the terminal may use the first propagation distance information to index, from the first mapping relationship information, the corresponding window offset as the current window offset. Thus, it is further ensured that the offset of the starting position of the downlink search space window can be adaptively adjusted as the propagation distance between the terminal and the satellite changes, to realize adaptive adjustment of the offset of the downlink search space window between the network device and the terminal, and it is ensured that the network device and the terminal always maintain consistency in terms of offset of the downlink search space window.

Specifically, the terminal acquires the first propagation distance information as follows. The terminal acquires current position information; and the terminal calculates first propagation distance information according to the current position information and a preset satellite ephemeris.

It should be noted that, the terminal may calculate the current position information through a global navigation satellite system (GNSS), and then calculate the propagation distance between the current position of the terminal and the satellite according to the current position information and the preset satellite ephemeris.

In a possible example, after the terminal determines the current window offset from the first mapping relationship information according to the first propagation distance information, the method can further include the following. The terminal determines a current PUR transmission resource block according to the second configuration information and the current window offset, and transmits uplink data on the current PUR transmission resource block.

It should be noted that, the mapping relationship information between the PUR transmission resource block and the window offset may be indicative of a mapping relationship between multiple RUR transmission resource blocks configured for a PUR transmission occasion and multiple window offsets, therefore, the terminal can index, according to the current window offset, the corresponding PUR transmission resource block from the mapping relationship information as the current PUR transmission resource block. In this way, uplink data is transmitted on the current PRB transmission resource block to implement PUR transmission.

In addition, in "Case 2", the network device may also instruct, by delivering the MAC CE, the terminal to update the current window offset as in "Case 1", which is not described herein again.

In conclusion, the following embodiment of the disclosure further summarizes the technical solution in "Case 2" as follows.

For the network device, the network device sends the second configuration information for PUR transmission to the terminal through the RRC dedicated signaling. The second configuration information includes the PUR transmission period information, the resource configuration information about a PUR transmission occasion, and the mapping relationship information between a PUR transmission resource block and a window offset. Then, the network device sends the first configuration information to the terminal through RRC dedicated signaling or MAC CE, where the first configuration information includes the first mapping relationship information.

For the terminal, first, the terminal receives the RRC dedicated signaling from the network device to acquire the second configuration information for PUR transmission. The second configuration information includes the PUR transmission period information, the resource configuration information about a PUR transmission occasion, and the mapping relationship information between a PUR transmission resource block and a window offset. Second, the terminal receives the RRC dedicated signaling or MAC CE from the network device to acquire the first configuration information. The first configuration information includes the first mapping relationship information, and next, the terminal acquires the first propagation distance information, and determines the current window offset from the first mapping relationship information according to the first propagation distance information. Finally, the terminal determines the current PUR transmission resource block according to the second configuration information and the current window offset, and transmits uplink data on the current PUR transmission resource block.

Figure 11:
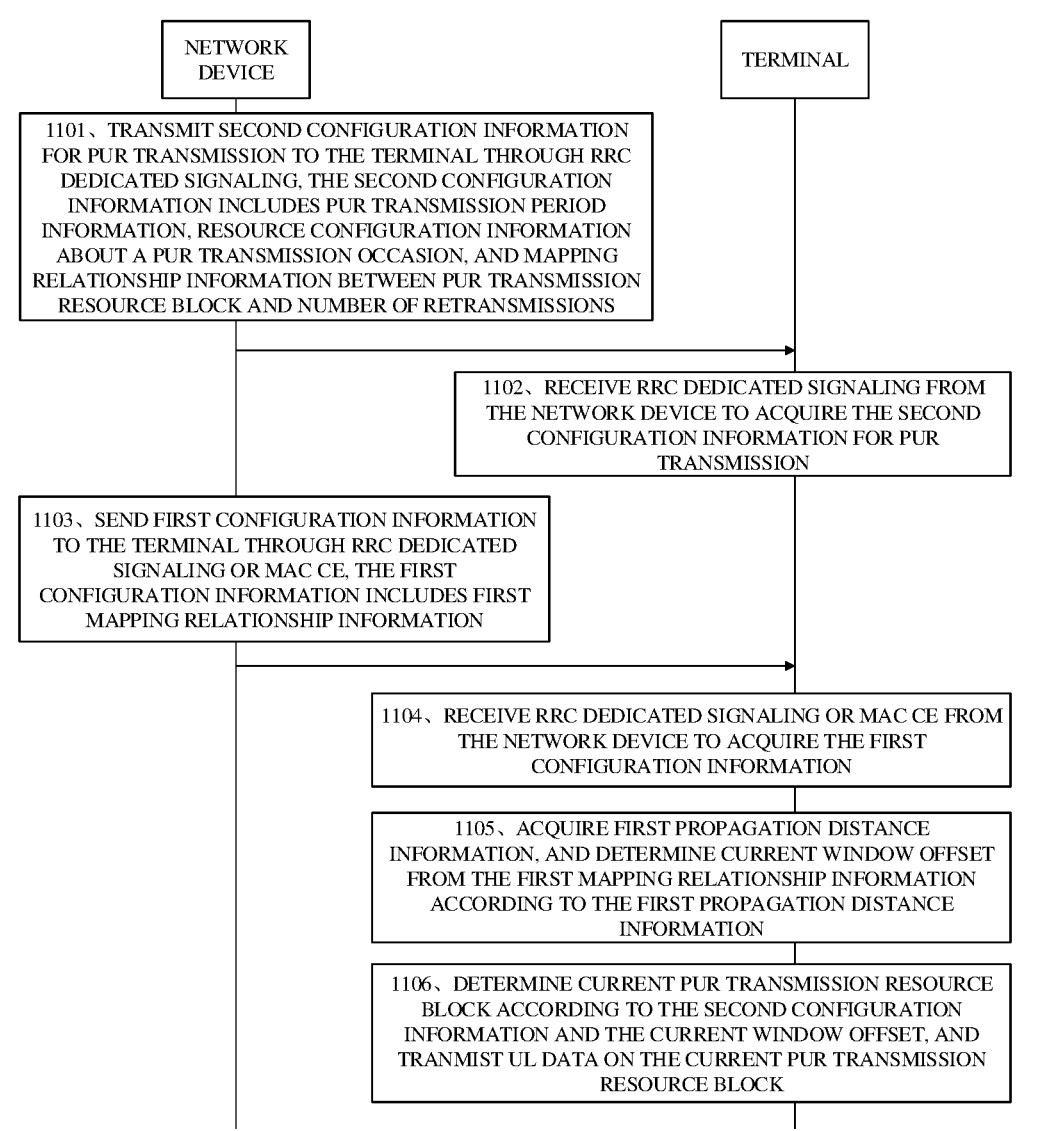
FIG. 11 is another schematic flowchart of a method for window offset determination according to an embodiment of the disclosure.

Exemplarily, "Case 2" may be exemplified as the process shown in FIG. 11.

Case 3:

In a possible example, if the first configuration information includes the current common timing advance or the current common timing advance change rate, before the network device sends the first configuration information to the terminal, the method can further include the following. The network device sends the second mapping relationship information to the terminal.

In a possible example, if the first configuration information includes the current common timing advance or the current common timing advance change rate, before the terminal acquires the first configuration information from the network device, the method can further include the following. The terminal acquires the second mapping relationship information from the network device.

Specifically, the second mapping relationship information may be indicated by system broadcast information or RRC dedicated signaling.

It should be noted that, in embodiments of the disclosure, the network device sends the second mapping relationship information to the terminal through system broadcast information or RRC dedicated signaling.

In a possible example, the terminal may determine the current window offset according to the first configuration information as follows. The terminal determines the current window offset from the second mapping relationship information according to the current common timing advance; or the terminal determines the current common timing advance according to the current common timing advance change rate, and the terminal determines the current window offset from the second mapping relationship information according to the current common timing advance.

It should be noted that, the second mapping relationship information may be indicative of a mapping relationship between the common timing advance and the window offset, therefore, the terminal may use the current common timing advance to index, from the second mapping relationship information, the corresponding window offset as the current window offset. Thus, it is further ensured that the offset of the starting position of the downlink search space window can be adaptively adjusted as the propagation distance between the terminal and the satellite changes, to realize adaptive adjustment of the offset of the downlink search space window between the network device and the terminal, and it is ensured that the network device and the terminal always maintain consistency in terms of offset of the downlink search space window.

In addition, how the terminal determines the current common timing advance according to the current common timing advance change rate may be calculated according to the following formula:

$$T_{com}=T_0+\alpha \cdot t$$

Where $T_{com}$ represents the current common timing advance; $T_0$ represents an initial common timing advance and is configured by the network; $\alpha$ indicates the current common timing advance change rate; t indicates a time size.

In addition, in "Case 3", the network device may also instruct, by delivering the MAC CE, the terminal to update the current window offset as in "Case 1", which is not described herein again.

In conclusion, the following embodiments of the disclosure further summarize the technical solution in "Case 3" into the following two modes.

Mode 1:

For the network device, the network device sends the second mapping relationship information to the terminal through system broadcast information or RRC dedicated signaling. Then, the network device sends the first configuration information to the terminal through RRC dedicated signaling or MAC CE, where the first configuration information includes the current common timing advance.

For the terminal, first, the terminal receives the system broadcast information or RRC dedicated signaling from the network device to acquire the second mapping relationship information. Second, the terminal receives the RRC dedicated signaling or MAC CE from the network device to acquire the first configuration information. The first configuration information includes the current common timing advance; and finally, the terminal determines the current window offset from the second mapping relationship information according to the current common timing advance.

Exemplarily, "Case 3" may be exemplified as the process shown in FIG. 12.

Mode 2:

For the network device, the network device sends the second mapping relationship information to the terminal through system broadcast information or RRC dedicated signaling. Then, the network device sends the first configuration information to the terminal through system broadcast information or RRC dedicated signaling. The first configuration information includes the current common timing advance change rate.

For the terminal, first, the terminal receives the system broadcast information or RRC dedicated signaling from the network device to acquire the second mapping relationship information. Second, the terminal receives the system broadcast information or RRC dedicated signaling from the network device to acquire the first configuration information. The first configuration information includes the current common timing advance change rate, and next, the terminal determines the current common timing advance according to the current common timing advance change rate. Finally, the terminal determines the current window offset from the second mapping relationship information according to the current common timing advance.

Exemplarily, "Case 3" may be exemplified as the process shown in FIG. 13.

It can be seen that, through the descriptions in the foregoing "Case 1", "Case 2", and "Case 3", embodiments of the disclosure may have different technical solutions to solve the problem of how to determine the window offset, this helps to ensure that the offset of the starting position of the downlink search space window can be adaptively adjusted as the propagation distance between the terminal and the satellite changes, to realize adaptive adjustment of the offset of the downlink search space window between the network device and the terminal, and it is ensured that the network device and the terminal always maintain consistency in terms of offset of the downlink search space window.

The solutions of the embodiments of the disclosure are mainly introduced from the perspective of interaction between each network element in the methods. It can be understood that, in order to implement the foregoing functions, a terminal or a network device includes a hardware structure and/or a software module corresponding to each function. A person skilled in the art should be easily aware that, in combination with the examples described in the embodiments disclosed in this specification, units and algorithm steps can be implemented by hardware or a combination of hardware and computer software. Whether a certain function is executed in hardware or computer software driven hardware depends on specific applications and design constraint conditions of the technical solutions. A person skilled in the art may use different methods to implement the described functions for each particular application, but such implementation shall not be considered as going beyond the scope of the disclosure.

Embodiments of the disclosure may divide functional units of a terminal or a network device according to the foregoing method example. For example, functional units may be divided corresponding to respective functions, or two or more functions may be integrated into one processing unit. The integrated unit may be implemented in a form of hardware, and may also be implemented in a form of a software program module. It should be noted that, the division of units in embodiments of the disclosure is schematic, and is only logical function division, and there may be other division in actual implementation.

In the case of using integrated units, FIG. 14 provides a block diagram of functional units of an apparatus for window offset determination. The apparatus 1400 for window offset determination is applied to a terminal in a NTN communication system, and specifically includes a processing unit 1402 and a communication unit 1403. The processing unit 1402 is configured to control and manage actions of the terminal, for example, the processing unit 1402 is configured to support the terminal to execute the steps in FIG. 7, FIG. 8, FIG. 9, FIG. 11, FIG. 12 or FIG. 13 and other processes of the technical solution described in the disclosure. The communication unit 1403 is configured to support communication between the terminal and other devices in the NTN communication system. The apparatus 1400 for window offset determination can further include a storage unit 1401, configured to store a program code and data of the terminal.

The processing unit 1402 may be a processor or a controller, and may be, for example, a central processing unit (CPU), a general processor, a digital signal processor (DSP), an application-specific integrated circuit (ASIC), a field programmable gate array (FPGA), or another programmable logic device, a transistor logic device, a hardware component, or any combination thereof. It may implement or perform the various illustrative logical blocks, modules, and circuits described in connection with the present disclosure. The processing unit 1402 may also be a combination that implements a computation function, for example, a combination that includes one or more microprocessors, a combination of a DSP and a microprocessor, and the like. The communication unit 1403 may be a communication interface, a transceiver, a transceiving circuit, or the like, and the storage unit 1401 may be a memory. When the processing unit 1402 is a processor, the communication unit 1403 is a communication interface, and the storage unit 1401 is a memory, the apparatus 1400 for window offset determination according to the embodiment of the disclosure may be the terminal shown in FIG. 16.

In a specific implementation, the processing unit 1402 is configured to execute any step executed by the terminal in the foregoing method embodiment, and optionally invoke the communication unit 1403 to complete a corresponding operation when data transmission such as sending is executed. Detailed description will be given below.

The processing unit 1402 is configured to acquire first configuration information from a network device, and determine a current window offset according to the first configuration information, where the current window offset is used for representing an offset of delay in starting time of a downlink search space window corresponding to a current pre-configured uplink resource, and the starting time is an end position of the current pre-configured uplink resource.

It should be noted that, for specific implementation of each operation, reference may be made to the description in the method embodiments shown in FIG. 7, FIG. 8, FIG. 9, FIG. 11, FIG. 12, or FIG. 13, and details are not described herein again.

It can be seen that, in embodiments of the disclosure, first configuration information is acquired from the network device, and the current window offset is determined according to the first configuration information. The current window offset is indicative of the delay offset in the starting time of the downlink search space window corresponding to the current pre-configured uplink resource, and the starting time is the end position of the current pre-configured uplink resource, which helps to ensure that the offset of the starting position of the downlink search space window is adaptively adjusted as the propagation distance between the terminal and the satellite changes, to realize adaptive adjustment of the offset of the downlink search space window between the network device and the terminal, and it is ensured that the network device and the terminal always maintain consistency in terms of offset of the downlink search space window.

In a possible example, the first configuration information is indicated by at least one of RRC dedicated signaling, an MAC CE, and system broadcast information.

In a possible example, the first configuration information includes one of the following: initial value index information and effect-delay information, first mapping relationship information, a current common timing advance, and a current common timing advance change rate.

In a possible example, the initial value index information is used for determining a target value in the value list information, and the value list information is configured by the network; the effect-delay information is used for indicating to the terminal a delay for using the target value as the current window offset; the value list information is indicative of a list composed of multiple window offsets in sequence.

In a possible example, the value list information satisfies at least one of the following modes: values in the value list information are determined by a propagation distance between the terminal and a satellite in the NTN communication system, and an order of the values in the value list information corresponds to a movement position of the satellite.

In a possible example, if the first configuration information includes the initial value index information and the effect-delay information, before acquiring the first configuration information from the network device, the processing unit 1402 is further configured to acquire first information from the network device, where the first information includes the value list information.

In a possible example, the first information is indicated by the system broadcast information or RRC dedicated signaling.

In a possible example, in terms of determining the current window offset according to the first configuration information, the processing unit 1402 is specifically configured to: determine a target value from the value list information according to the initial value index information; set the target value as the current window offset after the effect-delay information expires.

In a possible example, the first information further includes period update information, where the period update information is indicative of a period of updating, by the terminal, the current window offset to a value that is next to a position of the target value in the value list information, and the period starts from a moment when the effect-delay information expires.

In a possible example, after determining the current window offset according to the first configuration information, the processing unit 1402 is further configured to: receive a MAC CE from the network device to acquire the first indication information, where the first indication information is used to instruct the terminal to update the current window offset to a value next to a position of the target value in the value list information.

In a possible example, the first mapping relationship information is indicative of a mapping relationship between a propagation distance from the terminal to a satellite in the NTN communication system and a window offset.

In a possible example, if the first configuration information includes the first mapping relationship information, before the first configuration information from the network device is acquired, the processing unit 1402 is further configured to acquire second configuration information for PUR transmission from the network device, where the second configuration information includes PUR transmission period information, resource configuration information about a PUR transmission occasion, and mapping relationship information between a PUR transmission resource block and a window offset.

In one possible example, the second configuration information is indicated by the RRC dedicated signaling.

In a possible example, in terms of determining the current window offset according to the first configuration information, the processing unit 1402 is specifically configured to: acquire first propagation distance information, where the first propagation distance information is indicative of a propagation distance between current position information about the terminal and a satellite; determine the current window offset from first mapping relationship information according to the first propagation distance information.

In a possible example, after the current window offset is determined from the first mapping relationship information according to the first propagation distance information, the processing unit 1402 is further configured to determine a current PUR transmission resource block according to the second configuration information and the current window offset, and transmit uplink data by using the current PUR transmission resource block.

In a possible example, the current common timing advance is used for determining a current window offset from second mapping relationship information, where the second mapping relationship information is configured by the network; the current common timing advance change rate is used for determining the current common timing advance; and the second mapping relationship information is indicative of a mapping relationship between the common timing advance and a window offset.

In a possible example, if the first configuration information includes the current common timing advance or the common timing advance change rate, before acquiring the first configuration information from the network device, the processing unit 1402 is further configured to acquire the second mapping relationship information from the network device.

In a possible example, the second mapping relationship information is indicated by system broadcast information or RRC dedicated signaling.

In a possible example, in terms of determining the current window offset according to the first configuration information, the processing unit 1402 is specifically configured to: determine the current window offset from the second mapping relationship information according to the current common timing advance, or determine the current common timing advance based on the current common timing advance change rate, and determine the current window offset from the second mapping relationship information based on the current common timing advance.

Figure 15:
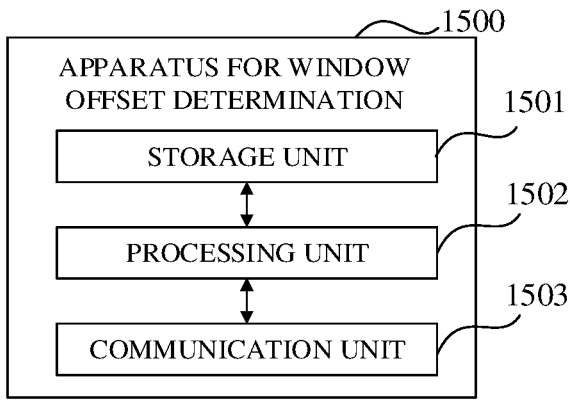
FIG. 15 is another block diagram of functional units of an apparatus for window offset determination according to an embodiment of the disclosure.

In the case of employing an integrated unit, FIG. 15 provides a block diagram of functional units of still another apparatus for window offset determination. The apparatus 1500 for window offset determination is applied to a network device in a NTN communication system, and specifically includes a processing unit 1502 and a communication unit 1503. The processing unit 1502 is configured to control and manage actions of a network device. For example, the processing unit 1502 is configured to support the network device to perform steps in FIG. 7, 8, 9, 11, 12, or 13, and other processes for the technical solutions described in the disclosure. The communication unit 1503 is configured to support communication between the network device and other devices in the NTN communication system. The apparatus 1500 for window offset determination can further include a storage unit 1501, configured to store program codes and data of the network device.

The processing unit 1502 may be a processor or a controller, and may be, for example, a CPU, a DSP, an ASIC, an FPGA or another programmable logic device, a transistor logic device, a hardware component, or any combination thereof. It may implement or perform the various illustrative logical blocks, modules, and circuits described in connection with the present disclosure. The processing unit 1502 may also be a combination that implements a computing function, for example, a combination that includes one or more microprocessors, a combination of a DSP and a microprocessor, and the like. The communication unit 1503 may be a communication interface, a transceiver, a transmit/receive (T/R) circuit, or the like, and the storage unit 1501 may be a memory. When the processing unit 1502 is a processor, the communication unit 1503 is a communication interface, and the storage unit 1501 is a memory, the apparatus 1500 for window offset determination according to the embodiment of the disclosure may be the network device shown in FIG. 17.

In a specific implementation, the processing unit 1502 is configured to execute any step executed by the network device in the foregoing method embodiment, and when data transmission such as sending is executed, the communication unit 1503 is optionally invoked to complete a corresponding operation. Detailed description will be given below.

The processing unit 1502 is configured to send first configuration information to a terminal, where the first configuration information is used for determining a current window offset, the current window offset is indicative of an offset of delay in starting time of a downlink search space window corresponding to a current pre-configured uplink resource, and the starting time is an end position of the current pre-configured uplink resource.

It should be noted that, for specific implementation of each operation, reference may be made to the description in the method embodiments shown in FIG. 7, FIG. 8, FIG. 9, FIG. 11, FIG. 12, or FIG. 13, and details are not described herein again.

It can be seen that, in embodiments of the disclosure, the first configuration information is sent to the terminal, and the first configuration information is used for determining the current window offset. The current window offset is indicative of the offset of the starting position of the downlink search space window corresponding to the current pre-configured uplink resource, furthermore, the starting time is the end position of the current pre-configured uplink resource, which helps to ensure that the offset of the starting position of the downlink search space window is adaptively adjusted as the propagation distance between the terminal and the satellite changes, to realize adaptive adjustment of the offset of a downlink search space window between the network device and the terminal, and it is ensured that the network device and the terminal always maintain consistency in terms of offset of the downlink search space window.

In a possible example, the first configuration information is indicated by at least one of RRC dedicated signaling, an MAC CE, and system broadcast information.

In a possible example, the first configuration information includes one of the following: initial value index information and effect-delay information, first mapping relationship information, a current common timing advance, and a current common timing advance change rate.

In a possible example, the initial value index information is used for determining a target value in the value list information, and the value list information is configured by the network; the effect-delay information indicates a delay for the terminal to take the target value as the current window offset; the value list information is indicative of a list composed of multiple window offsets in sequence.

In a possible example, the value list information satisfies at least one of the following modes: values in the value list information are determined by a propagation distance between the terminal and a satellite in the NTN communication system, and an order of the values in the value list information corresponds to a movement position of the satellite.

In a possible example, if the first configuration information includes the initial value index information and the effect-delay information, before sending the first configuration information to the terminal, the processing unit 1502 is further configured to send first information to the terminal, where the first information includes the value list information.

In one possible example, the first information is indicated by the system broadcast information or RRC dedicated signaling.

In a possible example, the first information further includes period update information, where the period update information is indicative of a period of updating, by the terminal, the current window offset to a value that is next to a position of the target value in the value list information, and the period starts from a moment when the effect-delay information expires.

In a possible example, after sending the first configuration information to the terminal, the processing unit 1502 is further configured to send first indication information to the terminal through an MAC CE, where the first indication information is used to instruct the terminal to update the current window offset to a value that is next to a position of the target value in the value list information.

In a possible example, the first mapping relationship information is indicative of a mapping relationship between a propagation distance from the terminal to a satellite in the NTN communication system and a window offset.

In a possible example, if the first configuration information includes first mapping relationship information, before sending the first configuration information to the terminal, the processing unit 1502 is further configured to send second configuration information for PUR transmission to the terminal, where the second configuration information includes PUR transmission period information, resource configuration information about a PUR transmission occasion, and mapping relationship information between a PUR transmission resource block and a window offset.

In one possible example, the second configuration information is indicated by RRC dedicated signaling.

In a possible example, the current common timing advance is used for determining the current window offset from the second mapping relationship information, and the second mapping relationship information is configured by the network; the current common timing advance change rate is used for determining the current common timing advance; and the second mapping relationship information is indicative of the mapping relationship between the common timing advance and the window offset.

In a possible example, if the first configuration information includes the current common timing advance or the common timing advance change rate, before sending the first configuration information to the terminal, the processing unit 1502 is further configured to send the second mapping relationship information to the terminal.

In a possible example, the second mapping relationship information is indicated by the system broadcast information or RRC dedicated signaling.

Figure 16:
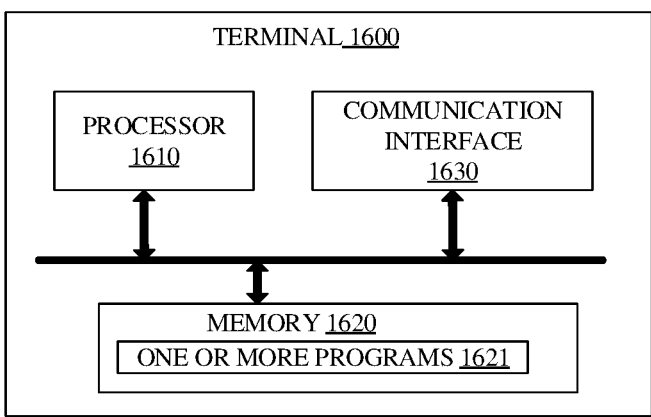
FIG. 16 is a schematic structural diagram of a terminal according to an embodiment of the disclosure.

Please refer to FIG. 16, FIG. 16 is a schematic structural diagram of a terminal according to an embodiment of the disclosure, where a terminal 1600 includes a processor 1610, a memory 1620, a communication interface 1630, and at least one communication bus configured to connect the processor 1610, the memory 1620, and the communication interface 1630.

The memory 1620 includes, but is not limited to, a random access memory (RAM), a read-only memory (ROM), an erasable programmable read-only memory (PROM), or a portable read-only memory (CD-ROM). The memory 1620 is configured to store related instructions and data.

The communications interface 1630 is configured to transmit and receive data.

The processor 1610 may be one or more CPUs, and in a case in which the processor 1610 is a CPU, the CPU may be a single core CPU or a multi-core CPU.

The processor 1610 in the terminal 1600 is configured to read one or more programs 1621 stored in the memory 1620 to perform the following steps: acquiring first configuration information from the network device; determining a current window offset according to the first configuration information, wherein the current window offset is indicative of an offset of delay in starting time of a downlink search space window corresponding to a current pre-configured uplink resource, and the starting time is an end position of the current pre-configured uplink resource.

It should be noted that, for specific implementation of each operation, reference may be made to the description in the method embodiments shown in FIG. 7, FIG. 8, FIG. 9, FIG. 11, FIG. 12, or FIG. 13, and details are not described herein again.

It can be seen that in embodiments of the disclosure, the first configuration information is acquired from the network device, and the current window offset is determined according to the first configuration information. The current window offset is indicative of the delay offset of starting time of the downlink search space window corresponding to the current pre-configured uplink resource, furthermore, the starting time is the end position of the current pre-configured uplink resource, which helps to ensure that the offset of the starting position of the downlink search space window is adaptively adjusted as the propagation distance between the terminal and the satellite changes, to realize adaptive adjustment of the offset of the downlink search space window between the network device and the terminal, and it is ensured that the network device and the terminal always maintain consistency in terms of offset of the downlink search space window.

In a possible example, the first configuration information is indicated by at least one of RRC dedicated signaling, an MAC CE, and system broadcast information.

In a possible example, the first configuration information includes one of the following: initial value index information and effect-delay information, first mapping relationship information, a current common timing advance, and a current common timing advance change rate.

In a possible example, the initial value index information is used for determining a target value in the value list information, and the value list information is configured by the network; effect-delay information indicates a delay for the terminal to take the target value as the current window offset; the value list information is indicative of a list composed of multiple window offsets in sequence.

In a possible example, the value list information satisfies at least one of the following modes: values in the value list information are determined by a propagation distance between the terminal and a satellite in the NTN communication system, an order of the values in the value list information corresponds to a movement position of the satellite.

In a possible example, if the first configuration information includes initial value index information and effect-delay information, before acquiring the first configuration information from the network device, the processor 1610 is configured to read the one or more programs 1621 stored in the memory 1620 to further execute the following steps: acquiring first information from the network device, where the first information includes the value list information.

In one possible example, the first information is indicated by system broadcast information or RRC dedicated signaling.

In a possible example, in terms of determining the current window offset according to the first configuration information, the processor 1610 is configured to read one or more programs 1621 stored in the memory 1620 and specifically execute the following steps: determining a target value from the value list information according to the initial value index information; setting the target value as the current window offset after the effect-delay information expires.

In a possible example, the first information further includes period update information, where the period update information is indicative of a period of updating, by the terminal, the current window offset to a value that is next to a position of the target value in the value list information, and the period starts from a moment when the effect-delay information expires.

In a possible example, after determining the current window offset according to the first configuration information, the processor 1610 is configured to read the one or more programs 1621 stored in the memory 1620 and further perform the following steps: receiving an MAC CE from the network device to acquire the first indication information, the first indication information is used for instructing the terminal to update the current window offset to the value which is the next to the position of the target value in the value list information.

In a possible example, the first mapping relationship information is indicative of a mapping relationship between a propagation distance from the terminal to a satellite in the NTN communication system and a window offset.

In a possible example, if the first configuration information includes the first mapping relationship information, before the first configuration information is acquired from the network device, the processor 1610 configured to read the one or more programs 1621 stored in the memory 1620 to execute the following steps: acquiring second configuration information for PUR transmission from the network device, the second configuration information includes PUR transmission period information, resource configuration information about a PUR transmission occasion, and mapping relationship information between a PUR transmission resource block and a window offset.

In one possible example, the second configuration information is indicated by RRC dedicated signaling.

In a possible example, in terms of determining the current window offset according to the first configuration information, the processor 1610 configured to read one or more programs 1621 stored in the memory 1620 is configured to specifically execute the following steps: acquiring first propagation distance information, where the first propagation distance information is indicative of a propagation distance between the current position information about the terminal and a satellite; determining a current window offset from the first mapping relationship information according to the first propagation distance information.

In a possible example, after determining the current window offset from the first mapping relationship information according to the first propagation distance information, the processor 1610 is configured to read the one or more programs 1621 stored in the memory 1620 and to perform the following steps: determining a current PUR transmission resource block according to the second configuration information and the current window offset, and transmitting uplink data by using the current PUR transmission resource block.

In a possible example, the current common timing advance is used for determining the current window offset from second mapping relationship information, where the second mapping relationship information is configured by the network; the current common timing advance change rate is used for determining the current common timing advance; and the second mapping relationship information is indicative of a mapping relationship between the common timing advance and a window offset.

In a possible example, if the first configuration information includes the current common timing advance or the current common timing advance rate, before acquiring the first configuration information from the network device, the processor 1610 is configured to read the one or more programs 1621 stored in the memory 1620 to perform the following step: acquiring the second mapping relationship information from the network device.

In a possible example, the second mapping relationship information is indicated by system broadcast information or RRC dedicated signaling.

In a possible example, for determining the current window offset according to the first configuration information, the processor 1610 is configured to read one or more programs 1621 stored in the memory 1620 and specifically execute the following steps: determining the current window offset from the second mapping relationship information according to the current common timing advance, or determining the current common timing advance based on the current common timing advance change rate, and determining the current window offset from the second mapping relationship information based on the current common timing advance.

Figure 17:
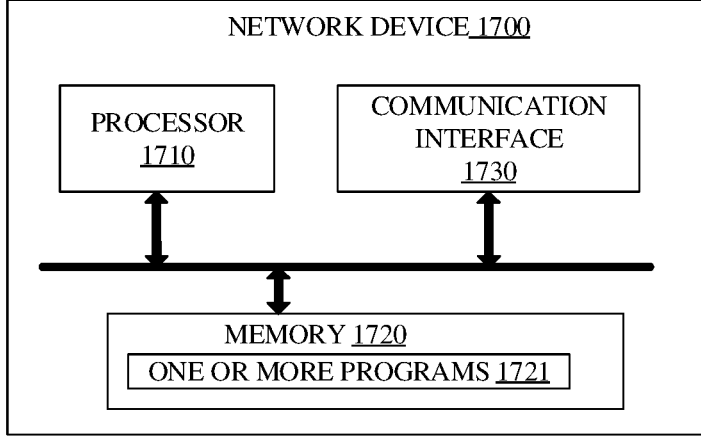
FIG. 17 is a schematic structural diagram of a network device according to an embodiment of the disclosure.

Please refer to FIG. 17, FIG. 17 is a schematic structural diagram of a network device according to an embodiment of the disclosure. The network device 1700 includes a processor 1710, a memory 1720, a communication interface 1730, and at least one communication bus for connecting the processor 1710, the memory 1720, and the communication interface 1730.

The memory 1720 may include, but is not limited to, RAM, ROM, PROM, or CD-ROM, which may be utilized to store associated instructions and data.

The communications interface 1730 is configured to receive and transmit data.

The processor 1710 may be one or more CPUs, and in a case in which the processor 1710 is a CPU, the CPU may be a single core CPU or a multi-core CPU.

The processor 1710 in the network device 1700 is configured to read one or more programs 1721 stored in the memory 1720 to perform steps of sending first configuration information to a terminal, the first configuration information is used for determining a current window offset, and the current window offset is indicative of an offset of delay in starting time of a downlink search space window corresponding to a current pre-configured uplink resource, and the starting time is an end position of the current pre-configured uplink resource.

It should be noted that, for specific implementation of each operation, reference may be made to the description in the method embodiments shown in FIG. 7, FIG. 8, FIG. 9, FIG. 11, FIG. 12, or FIG. 13, and details are not described herein again.

It can be seen that, in embodiments of the disclosure, the first configuration information is sent to the terminal, and the first configuration information is used for determining the current window offset. The current window offset is indicative of the offset of the delay of the starting time of the downlink search space window corresponding to the current pre-configured uplink resource, furthermore, the starting time is the end position of the current pre-configured uplink resource, which helps to ensure that the offset of the starting position of the downlink search space window is adaptively adjusted as the propagation distance between the terminal and the satellite changes, to realize adaptive adjustment of the offset of the downlink search space window between the network device and the terminal, and it is ensured that the network device and the terminal always maintain consistency in terms of offset of the downlink search space window.

In a possible example, the first configuration information is indicated by at least one of RRC dedicated signaling, an MAC CE, and system broadcast information.

In a possible example, the first configuration information includes one of the following: initial value index information and effect-delay information, first mapping relationship information, a current common timing advance, and a current common timing advance change rate.

In a possible example, the initial value index information is used for determining a target value in the value list information, and the value list information is configured by the network; effect-delay information indicates a delay for the terminal to take the target value as the current window offset; the value list information is indicative of a list composed of multiple window offsets in sequence.

In a possible example, the value list information satisfies at least one of the following modes: values in the value list information are determined by a propagation distance between the terminal and a satellite in the NTN communication system, an order of the values in the value list information corresponds to a movement position of the satellite.

In a possible example, if the first configuration information includes the initial value index information and the effect-delay information, before sending the first configuration information to the terminal, the processor 1710 is configured to read the one or more programs 1721 stored in the memory 1720 to further perform the following step: sending first information to the terminal, where the first information includes the value list information.

In one possible example, the first information is indicated by system broadcast information or RRC dedicated signaling.

In a possible example, the first information further includes period update information, where the period update information is indicative of a period of updating, by the terminal, the current window offset to a value that is next to a position of the target value in the value list information, and the period starts from a moment when the effect-delay information expires.

In a possible example, after sending the first configuration information to the terminal, the processor 1710 is configured to read one or more programs 1721 stored in the memory 1720 to execute the following step: sending first indication information to the terminal through the MAC CE, where the first indication information is used to instruct the terminal to update the current window offset to a value that is the next to the position of the target value in the value list information.

In a possible example, the first mapping relationship information is indicative of a mapping relationship between a propagation distance from the terminal to a satellite in the NTN communication system and a window offset.

In a possible example, if the first configuration information includes the first mapping relationship information, before sending the first configuration information to the terminal, the processor 1710 is configured to read the one or more programs 1721 stored in the memory 1720 to execute the following step: sending second configuration information for PUR transmission to the terminal, the second configuration information includes PUR transmission period information, resource configuration information about a PUR transmission occasion, and mapping relationship information between a PUR transmission resource block and a window offset.

In one possible example, the second configuration information is indicated by RRC dedicated signaling.

In a possible example, the current common timing advance is used for determining the current window offset from the second mapping relationship information, and the second mapping relationship information is configured by the network; the current common timing advance change rate is used for determining the current common timing advance; and the second mapping relationship information is indicative of a mapping relationship between the common timing advance and a window offset.

In a possible example, if the first configuration information includes the current common timing advance or the current common timing advance change rate, before sending the first configuration information to the terminal, the processor 1710 is configured to read the one or more programs 1721 stored in the memory 1720 to execute the following step: sending the second mapping relationship information to the terminal.

In a possible example, the second mapping relationship information is indicated by system broadcast information or RRC dedicated signaling.

Embodiments of the disclosure further provide a chip. The chip includes a processor, which is used for invoking and running a computer program from a memory, so that a device equipped with the chip executes some or all of the steps described in the terminal or network device in the foregoing method embodiments.

Embodiments of the disclosure further provide a computer readable storage medium. The computer readable storage medium stores a computer program for exchanging electronic data. The computer program enables a computer to execute a part or all of the steps executed by a terminal or a network device in the foregoing method embodiments.

Embodiments of the disclosure further provide a computer program product. The computer program product includes a computer program. The computer program is operable to enable a computer to execute a part or all of the steps executed by a terminal or a network device in the foregoing method embodiments. The computer program product may be a software installation package.

The steps of the method or algorithm described in embodiments of the disclosure may be implemented by means of hardware, and may also be implemented by means of software instructions executed by a processor. The software instructions may consist of corresponding software modules, which may be stored in RAM, flash memory, ROM, EPROM, EEPROM, registers, hard disk, a removable disk, a compact disc-read only memory (CD-ROM), or any other form of storage medium known in the art. An exemplary storage medium is coupled to the processor such that the processor can read information from, and write information to, the storage medium. Certainly, the storage medium may also be a part of the processor, and the processor and the storage medium may be located in the ASIC. In addition, the ASIC may be located in a terminal or a network device. Certainly, the processor and the storage medium may also exist in the terminal or the network device as discrete components.

Those skilled in the art should appreciate that the functions described in embodiments of the disclosure may be implemented wholly or in part by software, hardware, firmware, or any combination thereof. When implemented using software, it may be implemented in whole or in part in the form of a computer program product including one or more computer instructions. When the computer program instruction is loaded and executed on the computer, a procedure or function according to the embodiment of the disclosure is totally or partially generated. The computer may be a general purpose computer, a special purpose computer, a computer network, or other programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (e. g., coax, fiber, DSL) or wireless (e. g., infrared, wireless, microwave, etc.) fashion. The computer readable storage medium may be any available medium that can be accessed by a computer, or a data storage device such as a server, a data center, or the like that includes one or more available media arrays.

The objectives, technical solutions, and beneficial effects of the embodiments of the disclosure are described in detail in the foregoing specific embodiments, It should be understood that the foregoing descriptions are merely specific implementations of the embodiments of the disclosure, but are not intended to limit the scope of protection of the embodiments of the disclosure, Any modifications, equivalent replacements, improvements and the like made on the basis of the technical solutions of the embodiments of the disclosure, All of which should be included in the scope of protection of the embodiments of the disclosure.

What is claimed is:

1. A method for window offset determination, applied to a terminal in a non-terrestrial network (NTN) communication system, wherein the NTN communication system comprises the terminal and a network device, and the method comprises:

acquiring first configuration information from the network device; and determining a current window offset according to the first configuration information, wherein the current window offset is used to represent an offset of a starting position of a downlink search space window corresponding to a current pre-configured uplink resource relative to a starting time, and the starting time is an end position of the current pre-configured uplink resource, wherein the first configuration information comprises one of: initial value index information and effect-delay information, first mapping relationship information, a current common timing advance, or a current common timing advance change rate, and the first mapping relationship information is indicative of a mapping relationship between a propagation distance from the terminal to a satellite in the NTN communication system and a window offset.

2. The method of claim 1, wherein the first configuration information is indicated by at least one of radio resource control (RRC) dedicated signaling, a media access control control-element (MAC CE), and system broadcast information.

3. The method of claim 1, wherein the current common timing advance is used for determining the current window offset from second mapping relationship information, wherein the second mapping relationship information is configured by the network device;

the current common timing advance change rate is used for determining the current common timing advance; and the second mapping relationship information is indicative of a mapping relationship between the common timing advance and a window offset.

4. The method of claim 3, wherein if the first configuration information comprises the current common timing advance or the current common timing advance change rate, before acquiring the first configuration information from the network device, the method further comprises:

acquiring the second mapping relationship information from the network device.

5. The method of claim 4, wherein the second mapping relationship information is indicated by system broadcast information or RRC dedicated signaling.

6. The method of claim 4, wherein determining the current window offset according to the first configuration information comprises:

determining the current window offset from the second mapping relationship information according to the current common timing advance; or determining the current common timing advance according to the current common timing advance change rate, and determining the current window offset from the second mapping relationship information according to the current common timing advance.

7. The method of claim 1, wherein the initial value index information is used for determining a target value in value list information, and the value list information is configured by the network device, and wherein the effect-delay information is indicative of a delay for the terminal to take the target value as the current window offset; and the value list information is indicative of a list containing a plurality of window offsets in sequence.

8. The method of claim 7, wherein the value list information satisfies at least one of the following modes:

values in the value list information are determined by a propagation distance between the terminal and the satellite in the NTN communication system; and an order of the values in the value list information corresponds to a movement position of the satellite.

9. A terminal in a non-terrestrial network (NTN) communication system, comprising:

a memory storing computer readable programs;

a transceiver;

a processor configured to invoke the computer readable programs to:

cause the transceiver to acquire first configuration information from a network device in the NTN communication system; and determine a current window offset according to the first configuration information, wherein the current window offset is used to represent an offset of a starting position of a downlink search space window corresponding to a current pre-configured uplink resource relative to a starting time, and the starting time is an end position of the current pre-configured uplink resource, wherein the first configuration information comprises one of: initial value index information and effect-delay information, first mapping relationship information, a current common timing advance, or a current common timing advance change rate, and the first mapping relationship information is indicative of a mapping relationship between a propagation distance from the terminal to a satellite in the NTN communication system and a window offset.

10. The terminal of claim 9, wherein the first configuration information is indicated by at least one of radio resource control (RRC) dedicated signaling, a media access control control-element (MAC CE), and system broadcast information.

11. The terminal of claim 9, wherein the current common timing advance is used for determining the current window offset from second mapping relationship information, wherein the second mapping relationship information is configured by the network device;

the current common timing advance change rate is used for determining the current common timing advance; and the second mapping relationship information is indicative of a mapping relationship between the common timing advance and a window offset.

12. The terminal of claim 11, wherein if the first configuration information comprises the current common timing advance or the current common timing advance change rate, before acquiring the first configuration information from the network device, the processing unit is further configured to:

acquire the second mapping relationship information from the network device.

13. The terminal of claim 12, wherein the second mapping relationship information is indicated by system broadcast information or RRC dedicated signaling.

14. The terminal of claim 12, wherein in terms of determining the current window offset according to the first configuration information, the processing unit is configured to:

determine the current window offset from the second mapping relationship information according to the current common timing advance; or determine the current common timing advance according to the current common timing advance change rate, and determine the current window offset from the second mapping relationship information according to the current common timing advance.

15. The terminal of claim 9, wherein the initial value index information is used for determining a target value in value list information, and the value list information is configured by the network, and wherein the effect-delay information is indicative of a delay for the terminal to take the target value as the current window offset; and the value list information is indicative of a list composed of a plurality of window offsets in sequence.

16. The terminal of claim 15, wherein the value list information satisfies at least one of the following modes:

values in the value list information are determined by a propagation distance between the terminal and the satellite in the NTN communication system; and an order of the values in the value list information corresponds to a movement position of the satellite.

17. A non-transitory computer readable storage medium, storing a computer program for exchanging electronic data, wherein the computer program causes a computer to:

acquire first configuration information from the network device; and determine a current window offset according to the first configuration information, wherein the current window offset is used to represent an offset of a starting position of a downlink search space window corresponding to a current pre-configured uplink resource relative to a starting time, and the starting time is an end position of the current pre-configured uplink resource, wherein the first configuration information comprises one of: initial value index information and effect-delay information, first mapping relationship information, a current common timing advance, or a current common timing advance change rate, and the first mapping relationship information is indicative of a mapping relationship between a propagation distance from the terminal to a satellite in the NTN communication system and a window offset.

\* \* \* \* \*